(12) United States Patent
Do et al.

(10) Patent No.: US 11,194,436 B2
(45) Date of Patent: Dec. 7, 2021

(54) TOUCH DISPLAY DEVICE WITH LINES CONNECTING TOUCH ELECTRODES NEXT TO A HOLE IN THE ACTIVE AREA

(71) Applicant: LG Display Co., Ltd., Seoul (KR)

(72) Inventors: Wonchang Do, Paju-si (KR); Seunghyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/905,856

(22) Filed: Jun. 18, 2020

(65) Prior Publication Data

US 2021/0096697 A1    Apr. 1, 2021

(30) Foreign Application Priority Data

Sep. 27, 2019   (KR) .......................... 10-2019-0119768

(51) Int. Cl.
*G06F 3/044* (2006.01)
*G06F 3/041* (2006.01)

(52) U.S. Cl.
CPC .......... *G06F 3/0448* (2019.05); *G06F 3/0412* (2013.01); *G06F 3/0446* (2019.05); *G06F 3/0447* (2019.05); *G06F 2203/04112* (2013.01)

(58) Field of Classification Search
CPC .. G06F 2203/04112; G06F 2203/04111; G06F 3/0448; G06F 3/0446; G06F 3/0443; G06F 3/0412
See application file for complete search history.

(56) References Cited

U.S. PATENT DOCUMENTS

| | | | |
|---|---|---|---|
| 2016/0140896 A1 | 5/2016 | Kwon et al. | |
| 2016/0307971 A1 | 10/2016 | Jeon | |
| 2018/0053792 A1 | 2/2018 | Shin et al. | |
| 2019/0214596 A1 | 7/2019 | Park | |
| 2020/0064968 A1* | 2/2020 | Kim | G06F 1/1686 |
| 2020/0110525 A1* | 4/2020 | Park | H01L 27/3223 |
| 2020/0168671 A1* | 5/2020 | Jang | G06F 3/04164 |
| 2020/0194721 A1* | 6/2020 | Lee | H01L 27/3244 |
| 2020/0278312 A1* | 9/2020 | Jeong | G01D 5/24 |
| 2020/0393936 A1* | 12/2020 | Bok | G06F 3/0443 |
| 2021/0096643 A1* | 4/2021 | Park | G06F 3/0416 |

FOREIGN PATENT DOCUMENTS

EP   3410278 A1   12/2018
WO  WO 2018/206947 A2  11/2018

OTHER PUBLICATIONS

Extended European Search Report, European Patent Application No. 20179486.4, dated Dec. 3, 2020, seventeen pages.

* cited by examiner

*Primary Examiner* — Liliana Cerullo
(74) *Attorney, Agent, or Firm* — Fenwick & West LLP

(57) ABSTRACT

Provided is a touch display device having a hole provided in an active area. Touch electrodes are disposed in at least a portion of the active area, in which the hole is provided and no images are displayed. The touch electrodes disposed in surrounding areas of the hole are easily connected. In a case in which a plurality of holes are disposed in the active area, a structure disposed in the area between the holes to increase the number of the touch electrode connecting lines is provided. This structure increases capacitance-generating areas between the intersecting touch electrode lines, thereby improving the performance of touch sensing in the area between the holes.

11 Claims, 15 Drawing Sheets

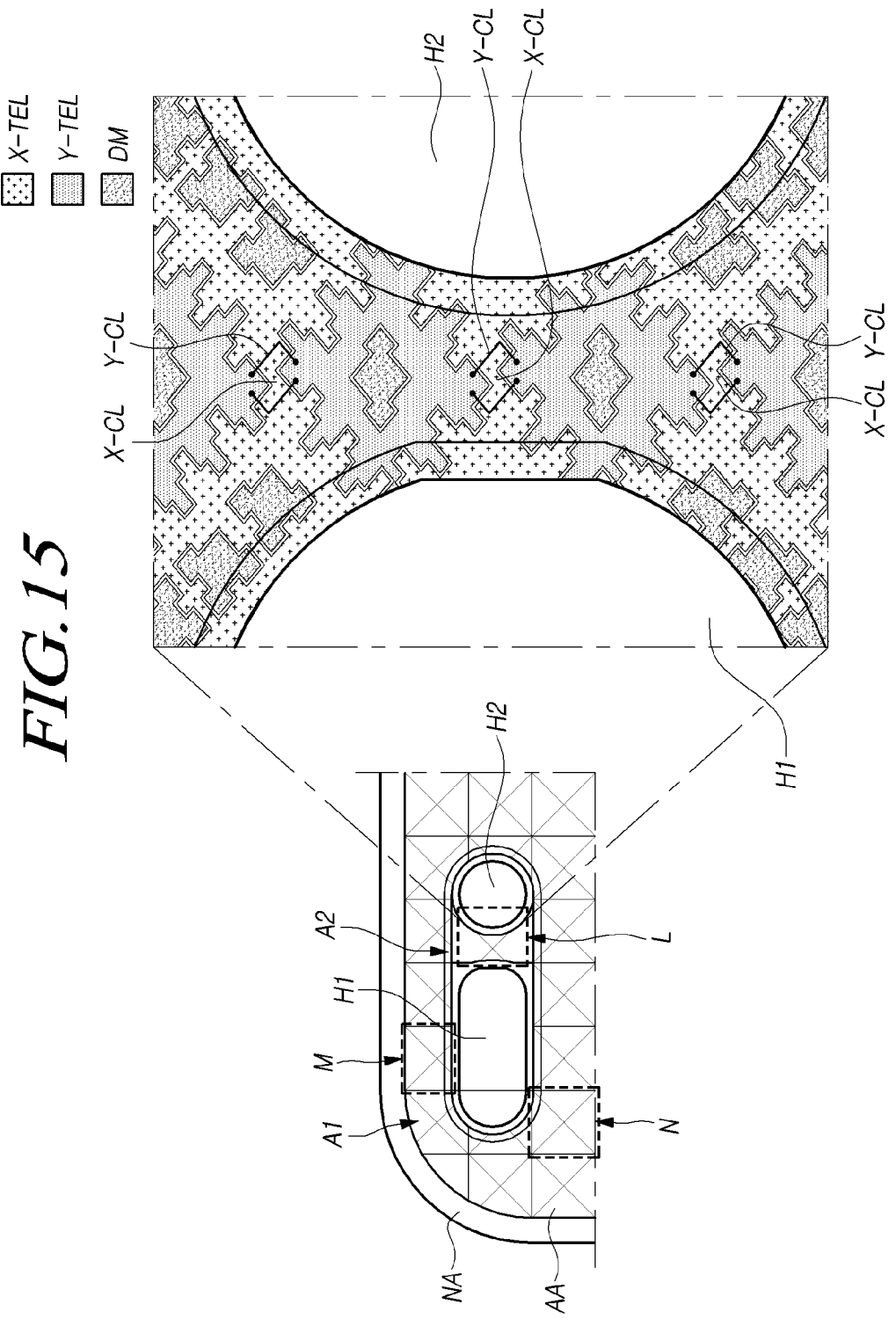

TOUCH DISPLAY DEVICE WITH LINES CONNECTING TOUCH ELECTRODES NEXT TO A HOLE IN THE ACTIVE AREA

CROSS REFERENCE TO RELATED APPLICATION

This application claims priority from Republic of Korea Patent Application No. 10-2019-0119768, filed on Sep. 27, 2019, which is hereby incorporated by reference in its entirety.

BACKGROUND

Field

Embodiments relate to a touch display device.

Description of Related Art

Along with the development of the information society, demand for display devices for displaying images is increasing. In this regard, a range of display devices, such as liquid crystal display (LCD) devices and organic light-emitting diode (OLED) display devices, have come into widespread use.

A display device may recognize a touch of a user to a display panel and perform input processing on the basis of the recognized touch in order to provide a variety of functions to the user. For example, a plurality of touch electrodes may be disposed in an active area of the display panel. In addition, the display device may detect the touch of the user by detecting a change in the capacitance of a touch electrode caused by the touch of the user.

The active area of the display panel in which such touch electrodes are disposed may have a variety of shapes. In some cases, an area in which a module, such as a camera sensor or a proximity sensor, is disposed may be located in the active area. In addition, the area in which the sensor is disposed may have the shape of a hole in the active area.

In a case in which the hole in which a sensor or the like is disposed is located in the active area, portions of touch electrodes disposed around the hole area or conductive lines connecting the touch electrodes may have to pass through the area in which the hole is disposed. Accordingly, there may be a range of difficulties in disposing touch electrodes or conductive lines connecting the touch electrodes in areas around the hole area located in the active area.

SUMMARY

Embodiments provide a solution allowing electrodes and conductive lines for touch sensing to be easily disposed in a structure having a hole in an active area of a display panel.

Embodiments provide a solution able to improve the sensitivity of touch sensing in the surrounding areas of a plurality of holes in the structure in which the plurality of holes are disposed in the active area of the display panel.

According to an aspect, embodiments provide a touch display device including: an active area including a first area in which a plurality of subpixels are disposed and a second area located more inward than at least a portion of a periphery of the first area, the second area overlapping a portion of the active area, except for a portion of the active area in which the plurality of subpixels are disposed; a first hole located in the second area; a second hole located in the second area to be spaced apart from the first hole; a plurality of touch electrodes disposed in the first area and disposed in at least a portion of the second area, except for a portion in which the first hole and the second hole are disposed; and a plurality of touch electrode connecting lines electrically connecting two adjacent touch electrodes among the plurality of touch electrodes.

In the touch display device, the number of touch electrode connecting lines, among the plurality of touch electrode connecting lines, connecting two adjacent touch electrodes, among the plurality of touch electrodes, in a first direction between the first hole and the second hole may be greater than the number of touch electrode connecting lines, among the plurality of touch electrode connecting lines, connecting two adjacent touch electrodes, among the plurality of touch electrodes, outside of the second area.

According to another aspect, embodiments provide a touch display device including: an active area including a first area in which a plurality of subpixels are disposed and a second area located more inward than at least a portion of a periphery of the first area; a first hole located in the second area; a second hole located in the second area to be spaced apart from the first hole; a plurality of touch electrodes disposed in the first area and disposed in at least a portion of the second area, except for a portion of the second area in which the first hole and the second hole are disposed; and a plurality of touch electrode connecting lines electrically connecting two adjacent touch electrodes among the plurality of touch electrodes. The portion of the second area in which the plurality of touch electrodes are disposed may overlap a portion of the active area, except for a portion of the active area in which the plurality of subpixels are disposed.

According to another aspect, embodiments provide a touch display device including: an active area including at least one hole; a plurality of touch electrodes disposed in at least a portion of the active area, except for a portion of the active area in which the hole is disposed; and a plurality of touch electrode connecting lines electrically connecting two adjacent touch electrodes among the plurality of touch electrodes. The number of touch electrode connecting lines among the plurality of touch electrode connecting lines, connected to at least one touch electrode, among the plurality of touch electrodes, in contact with a periphery of the hole, may be greater than the number of touch electrode connecting lines among the plurality of touch electrode connecting lines, connected to touch electrodes, among the plurality of touch electrodes, except for the touch electrode in contact with the periphery of the hole and touch electrodes, among the plurality of touch electrodes, directly connected to the touch electrode in contact with the periphery of the hole.

According to exemplary embodiments, in the structure in which one or more holes are located in the active area of the display panel, the touch metal may be disposed in a portion of the active area in which no images are displayed, such that the electrodes and the conductive lines for the touch sensing may be easily disposed around the holes.

According to exemplary embodiments, in the structure in which a plurality of holes are disposed in the active area of the display panel, the number of the touch electrode connecting lines located in the area between the holes may be increased, thereby improving the sensitivity of touch sensing in the areas around and between the holes.

BRIEF DESCRIPTION OF DRAWINGS

The above and other objects, features, and advantages of the present disclosure will be more clearly understood from the following detailed description, taken in conjunction with the accompanying drawings, in which:

FIG. 15 is a diagram illustrating another structure in which the touch electrodes and the touch electrode connecting lines are disposed in the areas around the holes illustrated in FIG. 12 according to embodiments.

DETAILED DESCRIPTION

Figure 1:
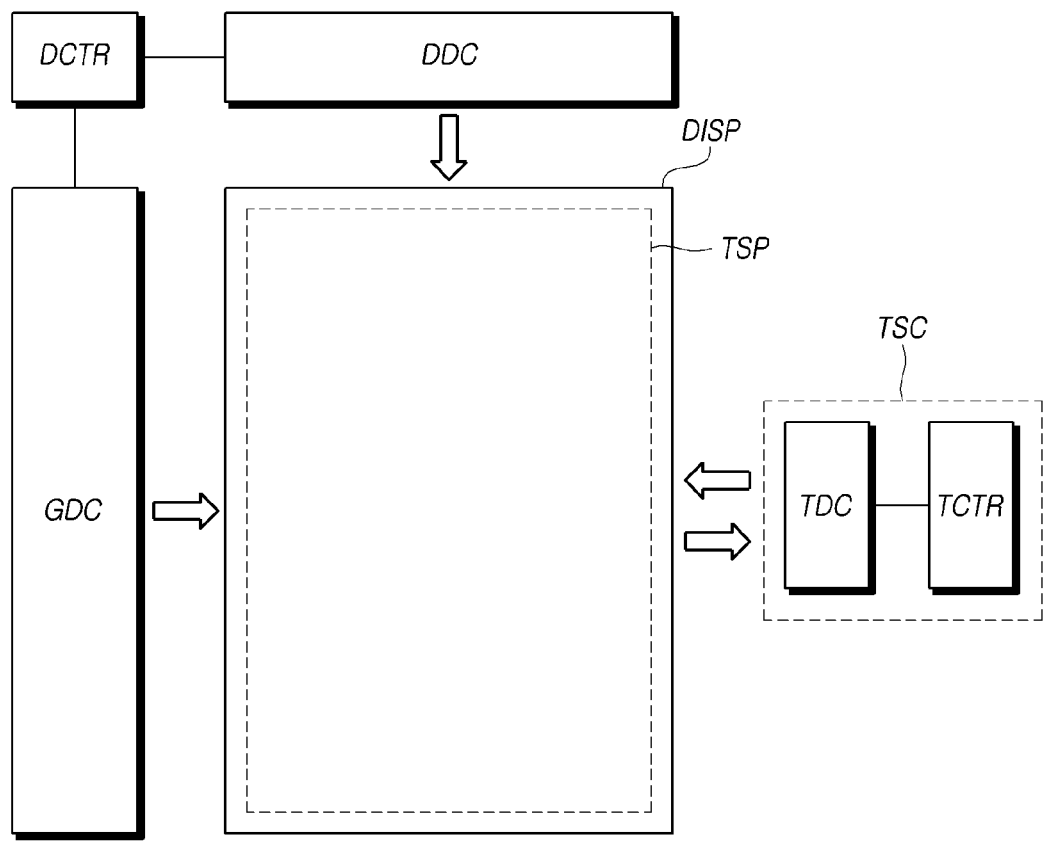
FIG. 1 is a diagram illustrating a schematic configuration of a touch display device according to embodiments.

In the following description of examples or embodiments of the present invention, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present invention, detailed descriptions of well-known functions and components incorporated herein will be omitted when it is determined that the description may make the subject matter in some embodiments of the present invention rather unclear. The terms such as "including", "having", "containing", "constituting", "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the present invention. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a diagram illustrating a system configuration of a touch display device according to embodiments.

Referring to FIG. 1, the touch display device according to embodiments may provide both an image display function and a touch-sensing function.

To provide the image display function, the touch display device according to embodiments may include: a display panel DISP in which a plurality of data lines and a plurality of gate lines are disposed and a plurality of subpixels defined by the plurality of data lines and the plurality of gate lines are arrayed; a data driver (or data driver circuit) DDC driving the plurality of data lines; a gate driver (or gate driver circuit) GDC driving the plurality of gate lines; a display controller DCTR controlling the data driver DDC and gate driver GDC; and the like.

Each of the data driver DDC, the gate driver GDC, and the display controller DCTR may be implemented as one or more separate components. In some cases, two or more of the data driver DDC, the gate driver GDC, and the display controller DCTR may be integrated into a single component. For example, the data driver DDC and the display controller DCTR may be implemented as a single integrated circuit (IC) chip.

To provide the touch-sensing function, the touch display device according to embodiments may include: a touch panel TSP including a plurality of touch electrodes; and a touch-sensing circuit TSC supplying a touch driving signal to the touch panel TSP, detecting a touch-sensing signal from the touch panel TSP, and detecting a touch of a user or determining a touch position (touch coordinates) on the touch panel TSP on the basis of a detected touch-sensing signal.

For example, the touch-sensing circuit TSC may include: a touch driving circuit TDC supplying a touch driving signal to the touch panel TSP and detecting a touch-sensing signal from the touch panel TSP; a touch controller TCTR determining at least one of the touch of the user and the touch coordinates on the basis of the touch-sensing signal detected by the touch driving circuit TDC; and the like.

The touch driving circuit TDC may include a first circuit part supplying the touch driving signal to the touch panel TSP and a second circuit part detecting the touch-sensing signal from the touch panel TSP.

The touch controller TCTR and the touch controller TCTR may be provided as separate components or, in some cases, may be integrated into a single component.

In addition, each of the data driver DDC, the gate driver GDC, and the touch driving circuit TDC is implemented as one or more ICs, and in terms of electrical connection to the display panel DISP, may have a chip-on-glass (COG) structure, a chip-on-film (COF) structure, a tape carrier package (TCP) structure, or the like. In addition, the gate driver GDC may have a gate-in-panel (GIP) structure.

In addition, each of the circuit configurations DDC, GDC, and DCTR for display driving and the circuit configurations TDC and TCTR for touch sensing may be implemented as one or more separate components. In some cases, one or more of the display driving circuit configurations DDC, GDC, and DCTR and one or more of the touch-sensing circuit configurations TDC and TCTR may be functionally integrated into one or more components.

For example, the data driver DDC and the touch driving circuit TDC may be integrated into one or more IC chips. In a case in which the data driver DDC and the touch driving circuit TDC are integrated into two or more IC chips, each of the two or more IC chips may have both a data driving function and a touch driving function.

In addition, the touch display device according to embodiments may be various types of devices, such as an organic light-emitting diode (OLED) display device and a liquid crystal display (LCD) device. Hereinafter, the touch display device will be described as an OLED display device for the sake of brevity. That is, although the display panel DISP may be various types of devices, such as an OLED and an LCD, the display panel DISP will be described as an OLED panel as an example for the sake of brevity.

In addition, as will be described later, the touch panel TSP may include a plurality of touch electrodes to which the touch driving signal is applicable or from which the touch-sensing signal is detectable; a plurality of touch routing lines connecting the plurality of touch electrodes to the touch driving circuit TDC; and the like.

The touch panel TSP may be located outside of the display panel DISP. That is, the touch panel TSP and the display panel DISP may be fabricated separately and combined thereafter. Such a touch panel TSP is referred to as an add-on touch panel.

Alternatively, the touch panel TSP may be disposed inside of the display panel DISP. That is, when the display panel DISP is fabricated, touch sensor structures of the touch panel TSP, including the plurality of touch electrodes, the plurality of touch routing lines, and the like, may be provided together with electrodes and signal lines used for the display driving. Such a touch panel TSP is referred to as an in-cell touch panel. Hereinafter, for the sake of brevity, the touch panel TSP will be described as an in-cell touch panel TSP as an example.

Figure 2:
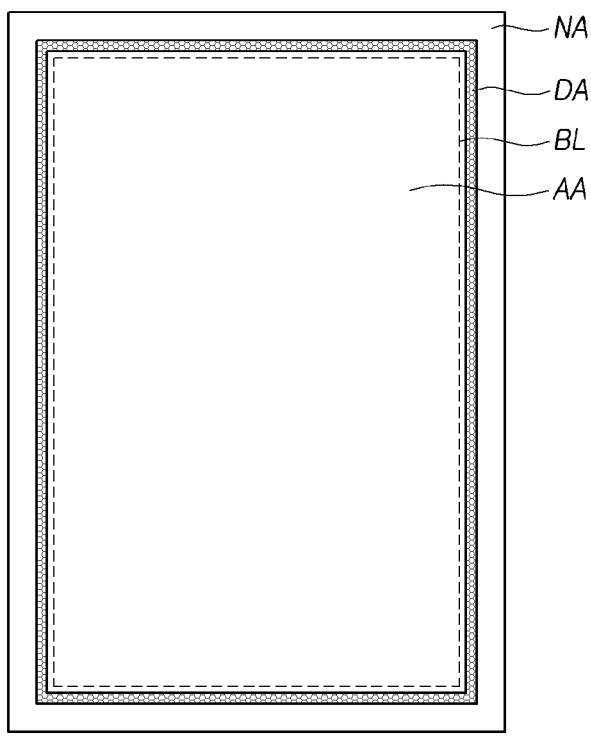
FIG. 2 is a diagram schematically illustrating the display panel of the touch display device according to embodiments.

FIG. 2 is a diagram schematically illustrating the display panel DISP of the touch display device according to embodiments.

Referring to FIG. 2, the display panel DISP may include an active area AA on which images are displayed and a nonactive area NA located outside of an outer boundary line BL of the active area AA. Images are not displayed in the nonactive area NA.

In the active area AA of the display panel DISP, a plurality of subpixels for displaying images are arrayed, and a variety of electrodes and signal lines for the display driving area are disposed.

In addition, the plurality of touch electrodes for the touch sensing, the plurality of touch routing lines electrically connected to the plurality of touch electrodes, and the like may be disposed in the active area AA of the display panel DISP. Accordingly, the active area AA may also be referred to as a touch-sensing area in which the touch sensing may be performed.

In the nonactive area NA of the display panel DISP, link lines produced by extending a variety of signal lines disposed in the active area AA or link lines electrically connected to the variety of signal lines disposed in the active area AA and pads electrically connected to the link lines may be disposed. The pads disposed in the nonactive area NA may be bonded or electrically connected to the display driving circuits, such as DDC and GDC.

In addition, in the nonactive area NA of the display panel DISP, link lines produced by extending a plurality of touch routing lines disposed in the active area AA or link lines electrically connected to the plurality of touch routing lines disposed in the active area AA and pads electrically connected to the link lines may be disposed. The pads disposed in the nonactive area NA may be bonded or electrically connected to the touch driving circuit TDC.

In the nonactive area NA, portions produced by expanding portions of the outermost touch electrodes among the plurality of touch electrodes disposed in the active area AA may be provided, and one or more electrodes (e.g. touch electrodes) made of the same material as the plurality of touch electrodes disposed in the active area AA may be further disposed.

That is, the entirety of the plurality of touch electrodes disposed in the display panel DISP may be located in the active area AA, specific touch electrodes (e.g. the outermost touch electrodes) among the plurality of touch electrodes disposed in the display panel DISP may be located in the nonactive area NA, or specific touch electrodes (e.g. the outermost touch electrodes) among the plurality of touch electrodes disposed in the display panel DISP may extend across at least a portion of the active area AA and at least a portion of the nonactive area NA.

In addition, referring to FIG. 2, the display panel DISP of the touch display device according to embodiments may include a dam area DA in which a dam DAM (see FIG. 9) is disposed, the dam DAM serving to prevent a layer (e.g. an encapsulation in the OLED display panel) in the active area AA from collapsing.

The dam area DA may be located at the boundary between the active area AA and the nonactive area NA, in a location of the nonactive area NA at the periphery of the active area AA, or the like.

The dam disposed in the dam area DA may be disposed to surround the active area AA in all directions or only at the periphery of one or more portions (i.e. portions in which a fragile layer is located) of the active area AA.

The dams disposed in the dam area DA may be connected to form a single pattern or to form two or more separate patterns. In addition, in the dam area DA, only a first dam may be disposed, or two dams (i.e. a first dam and a second dam) may be disposed, or three or more dams may be disposed.

In the dam area DA, the first dam may only be provided in one direction, and both the first dam and the second dam may be provided in the other direction.

Figure 3:
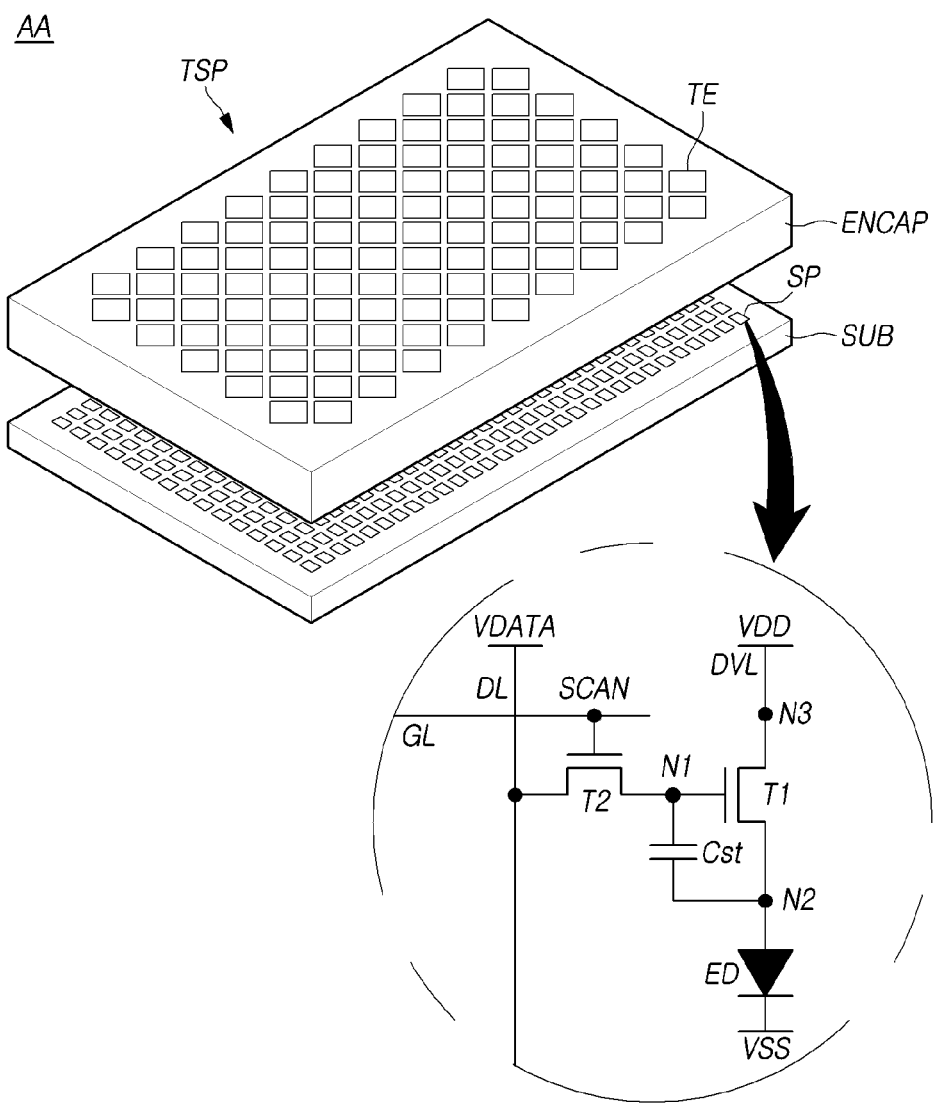
FIG. 3 is a diagram illustrating a structure in which the touch panel is disposed as an in-cell structure in the display panel according to embodiments.

FIG. 3 is a diagram illustrating a structure in which the touch panel TSP is disposed as an in-cell structure in the display panel DISP according to embodiments.

Referring to FIG. 3, a plurality of subpixels SP are arrayed on a substrate SUB in the active area AA of the display panel DISP.

Each of the subpixels SP may include an emitting device ED, a first transistor T1 driving the emitting device ED, a second transistor T2 delivering a data voltage VDATA to a first node N1 of the first transistor T1, a storage capacitor Cst maintaining a predetermined voltage for a single frame, and the like.

The first transistor T1 may include the first node N1 to which the data voltage VDATA is applicable, a second node N2 electrically connected to the emitting device ED, and a third node N3 to which a driving voltage is applied from a driving voltage line DVL. The first node N1 may be a gate node, the second node N2 may be a source node or a drain node, and the third node N3 may be a drain node or a source node. Such a first transistor T1 is also referred to as a driving transistor driving the emitting device ED.

The emitting device ED may include a first electrode (e.g. an anode), an emissive layer, and a second electrode (e.g. a cathode). The first electrode may be electrically connected to the second node N2 of the first transistor T1, and the second electrode may have a base voltage VSS applied thereto.

The emissive layer of the emitting device ED may be an organic emissive layer containing an organic material. In this case, the emitting device ED may be an organic light-emitting diode (OLED).

The second transistor T2 may be on/off controlled by a scan signal SCAN applied through a gate line GL and be electrically connected to the first node N1 of the first transistor T1 and a data line DL. Such a second transistor T2 is also referred to as a switching transistor.

When the second transistor T2 is turned on by the scan signal SCAN, the second transistor T2 delivers the data voltage VDATA supplied through the data line to the first node N1 of the first transistor T1.

The storage capacitor Cst may be electrically connected to the first node N1 and the second node N2 of the first transistor T1.

As illustrated in FIG. 3, each of the subpixels SP may have a 2T1C comprised of two transistors T1 and T2 and a single capacitor Cst. In some cases, each of the subpixels SP may further include one or more transistors or one or more capacitors.

The storage capacitor Cst may be an external capacitor intentionally designed to be disposed externally of the first transistor T1, rather than a parasitic capacitor (e.g. Cgs or Cgd), i.e. an internal capacitor present between the first node N1 and the second node N2 of the first transistor T1.

Each of the first transistor T1 and the second transistor T2 may be an n-type transistor or a p-type transistor.

As described above, circuit components, including the emitting device ED, two or more transistors T1 and T2, and one or more capacitor Cst, are disposed in the display panel DISP. Since such circuit components (in particular, the emitting device ED) are vulnerable to external moisture, oxygen, or the like, an encapsulation ENCAP preventing external moisture or oxygen from penetrating the circuit elements (in particular, the emitting device ED) may be disposed in the display panel DISP.

Such an encapsulation ENCAP may be a single layer or have a multilayer structure.

In addition, in the touch display device according to embodiments, the touch panel TSP may be disposed on the encapsulation ENCAP.

That is, in the touch display device, a touch sensor structure, including the plurality of touch electrodes TE, of the touch panel TSP may be disposed on the encapsulation ENCAP.

In the touch sensing, the touch driving signal or the touch-sensing signal may be applied to the touch electrodes TE. Then, in the touch sensing, a potential difference may be produced between a touch electrode TE and a cathode disposed on both sides of the encapsulation ENCAP, thereby generating unnecessary parasitic capacitance. Since such parasitic capacitance may reduce touch sensitivity, the distance between the touch electrode TE and the cathode may be designed to be a predetermined value (e.g. 1 μm) or more in consideration of the thickness of the panel, a panel fabrication process, display performance, and the like in order to reduce the parasitic capacitance. In this regard, for example, the thickness of the encapsulation ENCAP may be designed to be 1 μm or more.

Figure 4:
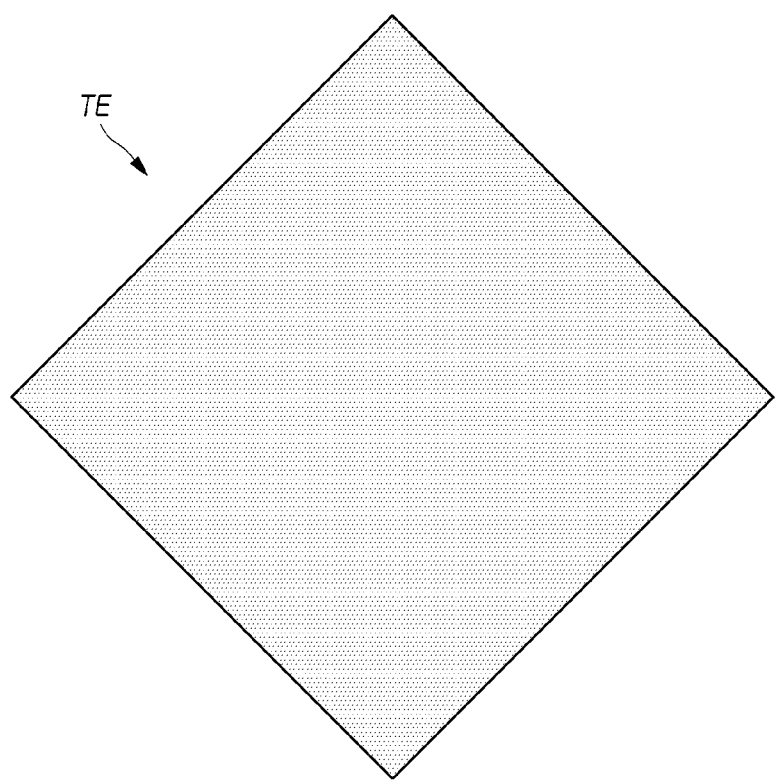
FIGS. 4 and 5 are diagrams illustrating types of touch electrodes disposed in the display panel according to embodiments.
Figure 5:
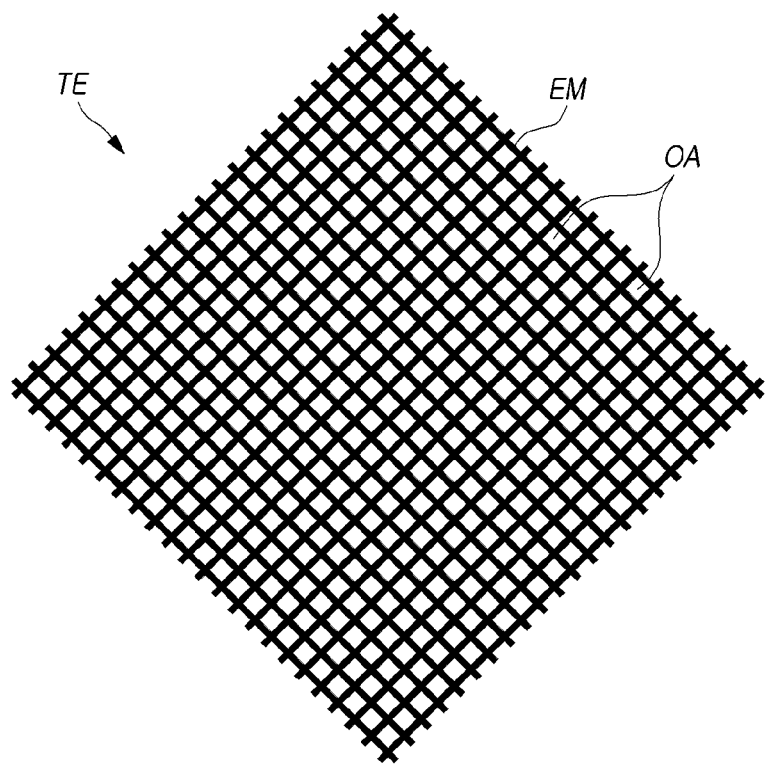

FIGS. 4 and 5 are diagrams illustrating types of touch electrodes TE disposed in the display panel DISP according to embodiments.

As illustrated in FIG. 4, each of the touch electrodes TE disposed in the display panel DISP may be a plate-shaped electrode metal without an open area. In this case, each of the touch electrodes TE may be a transparent electrode. That is, each of the touch electrodes TE may be made of a transparent electrode material such that light emitted by the plurality of subpixels SP disposed below the touch electrodes TE may pass through the touch electrodes TE.

Alternatively, as illustrated in FIG. 5, each of the touch electrodes TE disposed in the display panel DISP may be an electrode metal EM in the shape of a patterned mesh having two or more open areas OA.

The electrode metal EM is a portion substantially corresponding to the touch electrode TE and is a portion to which the touch driving signal is applied or from which the touch-sensing signal is detected.

As illustrated in FIG. 5, in a case in which each of the touch electrodes TE is the electrode metal EM in the shape of a patterned mesh, two or more open areas OA may be present in the area of the touch electrode TE.

Each of the plurality of open areas OA provided in each of the touch electrodes TE may correspond to the emitting area of one or more subpixels SP. That is, the plurality of open areas OA are passages allowing light emitted from the plurality of subpixels SP located therebelow to pass upward therethrough. Hereinafter, for the sake of brevity, each of the touch electrodes TE will be described as a mesh-shaped electrode metal EM as an example.

The electrode metal EM corresponding to each of the touch electrodes TE may be located on a bank disposed in an area, except for the emitting area of two or more subpixels SP.

In addition, a method of fabricating a plurality of touch electrode TE may include forming a mesh-shaped electrode metal EM having a wider area and then cutting the electrode metal EM to form a predetermined pattern such that portions of the electrode metal EM are electrically separated from each other, thereby fabricating a plurality of touch electrodes TE.

The outline of the touch electrode TE may have a rectangular shape, such as a diamond or a rhombus shape, as illustrated in FIGS. 4 and 5, or a variety of other shapes, such as a triangle, a pentagon, or a hexagon.

Figure 6:
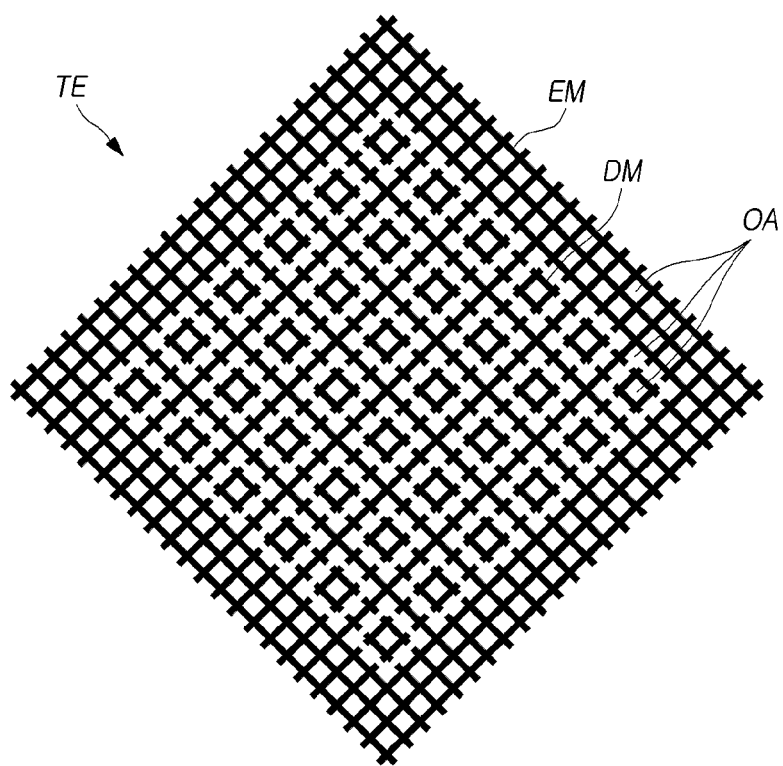
FIG. 6 is a diagram illustrating the mesh-shaped touch electrode illustrated in FIG. 5 according to embodiments.

FIG. 6 is a diagram illustrating the mesh-shaped touch electrode TE illustrated in FIG. 5.

Referring to FIG. 6, in the area of each of the touch electrodes TE, one or more dummy metals DM disconnected from the mesh-shaped electrode metal EM may be provided.

The electrode metal EM is a portion substantially corresponding to the touch electrode TE and is a portion to which the touch driving signal is applied or from which the touch-sensing signal is detected. In contrast, the dummy metals DM are portions to which the touch driving signal is not applied and from which the touch-sensing signal is not detected, although the dummy metals DM are portions located in the area of the touch electrode TE. That is, the dummy metals DM may be electrically floating metals.

Thus, the electrode metal EM may be electrically connected to the touch driving circuit TDC, but none of the dummy metals DM are electrically connected to the touch driving circuit TDC.

In the area of each of the entire touch electrodes TE, one or more dummy metals DM may be provided while being disconnected from the electrode metals EM.

Alternatively, one or more dummy metals DM may be provided in the area of each of specific touch electrodes TE among the entire touch electrodes TE while being disconnected from the electrode metal EM. That is, no dummy metals DM may be provided in the areas of the other touch electrodes TE.

The function of the dummy metals DM is related to a visibility issue. In a case in which only the mesh-shaped electrode metal EM is present in the area of the touch electrode TE without one or more dummy metals DM being present in the area of the touch electrode TE as illustrated in FIG. 5, the outline of the electrode metal EM may appear on the screen, thereby causing a visibility issue.

In contrast, in a case in which one or more dummy metals DM are present in the area of the touch electrode TE as illustrated in FIG. 6, the outline of the electrode metal EM appearing on the screen, i.e. the visibility issue, may be prevented.

In addition, touch sensitivity may be improved by adjusting the magnitude of capacitance according to each of the touch electrodes TE by adjusting the presence or absence or the number (or ratio) of the dummy metals DM of each of the touch electrodes TE.

In addition, specific points of the electrode metal EM provided in the area of a single touch electrode TE may be cut, so that the cut electrode metal EM form dummy metals DM. That is, the electrode metal EM and the dummy metals DM may be made of the same material provided on the same layer.

In addition, the touch display device according to embodiments may detect a touch on the basis of capacitance generated on the touch electrode TE.

The touch display device according to embodiments may detect a touch by a capacitance-based touch sensing method, more particularly, mutual capacitance-based touch sensing or self-capacitance-based touch sensing.

In the mutual capacitance-based touch sensing, the plurality of touch electrodes TE may be divided into driving touch electrodes (or transmitting touch electrodes) to which the touch driving signal is applied and sensing touch electrodes (or receiving touch electrodes) detecting the touch sensing signal and generating capacitance together with the driving touch electrodes.

In the mutual capacitance-based touch sensing, the touch-sensing circuit TSC detects a touch and determines touch coordinates on the basis of changes in the capacitance (i.e. mutual capacitance) occurring between the driving touch electrodes and the sensing touch electrodes, depending on the presence or absence of a pointer, such as a finger or a pen.

In the self-capacitance-based touch sensing, each of the touch electrodes TE serves as both a driving touch electrode and a sensing touch electrode. That is, the touch-sensing circuit TSC detects a touch and determines touch coordinates by applying the touch driving signal to one or more touch electrodes TE, detecting the touch-sensing signal through the touch electrode TE to which the touch driving signal is applied, and recognizing changes in the capacitance between the pointer, such as a finger or a pen, and the touch electrode TE, on the basis of the detected touch-sensing signal. Accordingly, in the self-capacitance-based touch sensing, there is no difference between the driving touch electrodes and the sensing touch electrodes.

As described above, the touch display device according to embodiment may perform the touch sensing by the mutual capacitance-based touch sensing or the self-capacitance-based touch sensing. Hereinafter, for the sake of brevity, the touch display device performing the mutual capacitance-based touch sensing and having a touch sensor structure for the mutual capacitance-based touch sensing will be described as an example.

Figure 7:
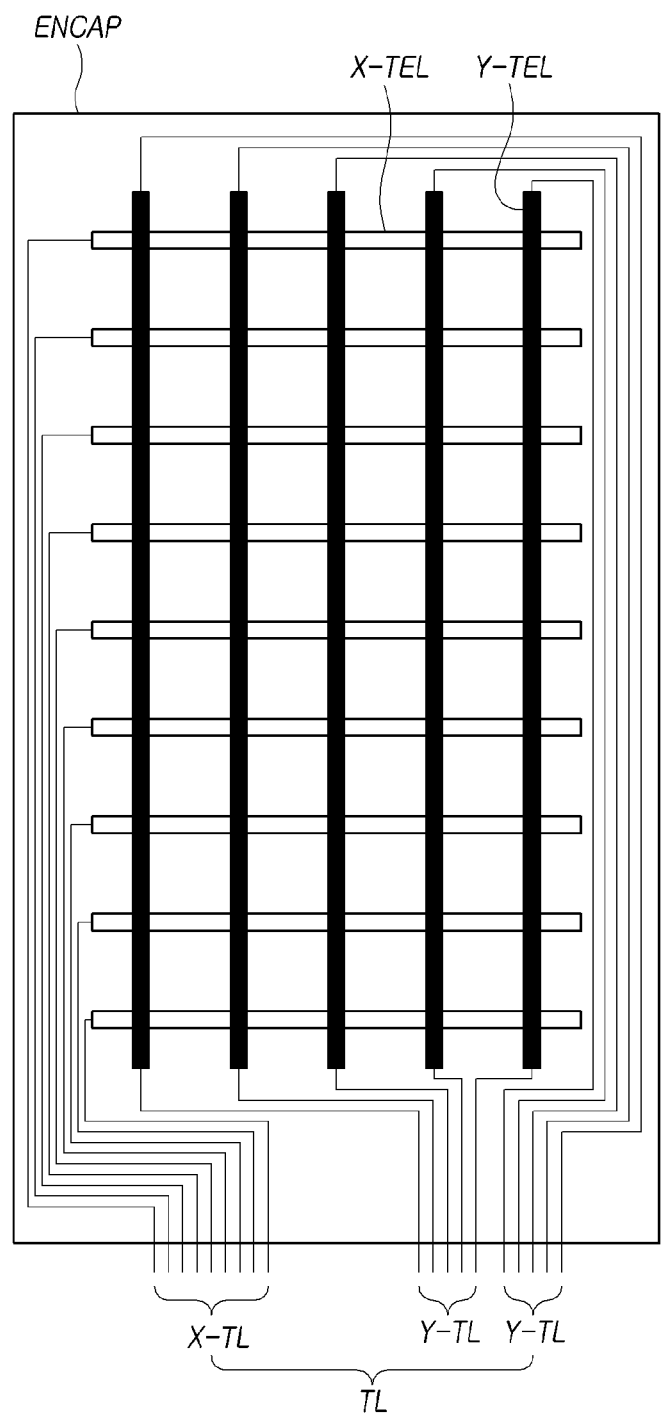
FIG. 7 is a diagram schematically illustrating a touch sensor structure in the display panel according to embodiments.
Figure 8:
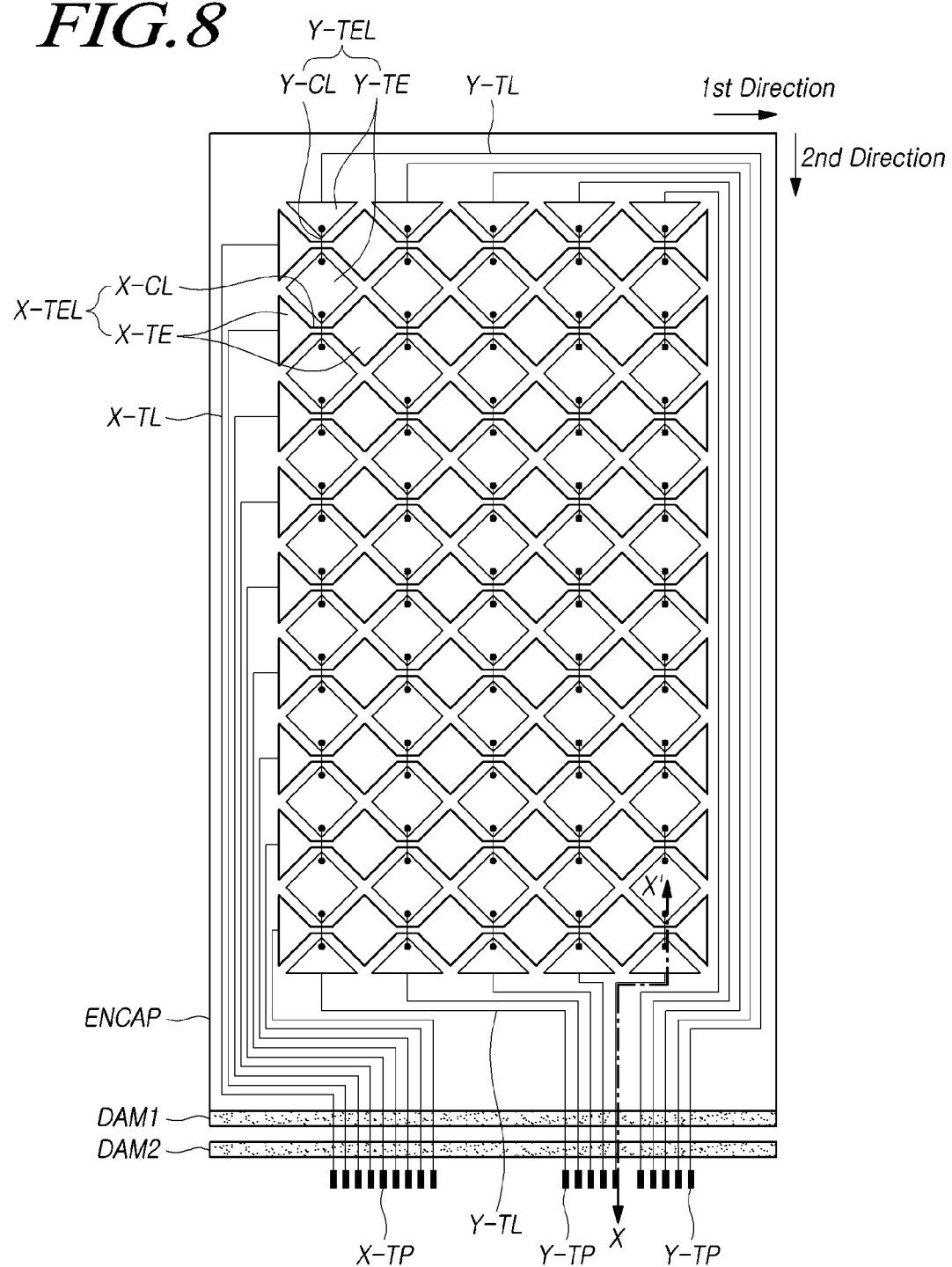
FIG. 8 is a diagram illustrating an example of the touch sensor structure illustrated in FIG. 7 according to embodiments.

FIG. 7 is a diagram schematically illustrating a touch sensor structure in the display panel DISP according to embodiments, and FIG. 8 is a diagram illustrating an example of the touch sensor structure illustrated in FIG. 7.

Referring to FIG. 7, the touch sensor structure for the mutual capacitance-based touch sensing may include a plurality of X-touch electrode lines X-TEL and a plurality of Y-touch electrode lines Y-TEL. Here, the plurality of X-touch electrode lines X-TEL and the plurality of Y-touch electrode lines Y-TEL are located on the encapsulation ENCAP.

Each of the plurality of X-touch electrode lines X-TEL may be disposed in a first direction, and the plurality of Y-touch electrode lines Y-TEL may be disposed in a second direction different from the first direction.

Herein, the first direction and the second direction may be different directions. For example, the first direction may be the X-axis direction, while the second direction may be the Y-axis direction. Alternatively, the first direction may be the Y-axis direction, while the second direction may be the X-axis direction. In addition, the first direction and the second direction may or may not intersect perpendicularly. In addition, the terms "column" and "row" as used herein are relative terms. The column and the row may be switched depending on the viewing perspective.

Each of the plurality of X-touch electrode lines X-TEL may be comprised of a plurality of X-touch electrodes X-TE electrically connected to each other. Each of the plurality of Y-touch electrode lines Y-TEL may be comprised of a plurality of Y-touch electrodes Y-TE electrically connected to each other.

Here, the plurality of X-touch electrodes X-TE and the plurality of Y-touch electrodes Y-TE are electrodes included in the plurality of touch electrodes TE, and have different functions.

For example, the plurality of X-touch electrodes X-TE constituting each of the plurality of X-touch electrode lines X-TEL may be the driving touch electrodes, while the plurality of Y-touch electrodes Y-TE constituting each of the plurality of Y-touch electrode lines Y-TEL may be the sensing touch electrodes. In this case, each of the plurality of X-touch electrode lines X-TEL corresponds to a driving touch electrode lines, and each of the plurality of Y-touch electrode lines Y-TEL corresponds to a sensing touch electrode line.

Alternatively, the plurality of X-touch electrodes X-TE constituting each of the plurality of X-touch electrode lines X-TEL may be the sensing touch electrodes, while the plurality of Y-touch electrodes Y-TE constituting each of the plurality of Y-touch electrode lines Y-TEL may be the driving touch electrodes. In this case, each of the plurality of X-touch electrode lines X-TEL corresponds to the sensing touch electrode line, and each of the plurality of Y-touch electrode lines Y-TEL corresponds to the driving touch electrode line.

A touch sensor metal for the touch sensing may include a plurality of touch routing lines TL in addition to the plurality of X-touch electrode lines X-TEL and the plurality of Y-touch electrode lines Y-TEL.

The plurality of touch routing lines TL may include one or more X-touch routing lines X-TL connected to the plurality of X-touch electrode lines X-TEL, respectively, and one or more Y-touch routing lines Y-TL connected to the plurality of Y-touch electrode lines Y-TEL, respectively.

Referring to FIG. 8, each of the plurality of X-touch electrode lines X-TEL may include a plurality of X-touch electrodes X-TE disposed in the same row (or column) and one or more X-touch electrode connecting lines X-CL electrically connecting the plurality of X-touch electrodes X-TE. Here, the X-touch electrode connecting lines X-CL respectively connecting two adjacent X-touch electrodes X-TE may be metals integrated with the two adjacent X-touch electrodes X-TE (see FIG. 8) or metals connected to the two adjacent X-touch electrodes X-TE via contact holes.

Each of the plurality of Y-touch electrode lines Y-TEL may include a plurality of Y-touch electrodes Y-TE disposed in the same column (or row) and one or more Y-touch electrode connecting lines Y-CL electrically connecting the plurality of Y-touch electrodes Y-1E. Here, the Y-touch electrode connecting lines Y-CL respectively connecting two adjacent Y-touch electrodes Y-TE may be metals integrated with the two adjacent Y-touch electrodes Y-TE or metals connected to the two adjacent Y-touch electrodes Y-TE via contact holes (see FIG. 8).

In areas in which the X-touch electrode lines X-TEL intersect the Y-touch electrode lines Y-TEL (i.e. touch electrode line intersecting areas), the X-touch electrode connecting lines X-CL may intersect the Y-touch electrode connecting lines Y-CL.

In this case, in areas in which the X-touch electrode lines X-TEL intersect the Y-touch electrode lines Y-TEL (i.e. touch electrode line intersecting areas), the X-touch electrode connecting lines X-CL may intersect the Y-touch electrode connecting lines Y-CL.

In a case in which the X-touch electrode connecting lines X-CL intersect the Y-touch electrode connecting lines Y-CL in the touch electrode line intersecting areas as described above, the X-touch electrode connecting lines X-CL must be located on a layer different from that of the Y-touch electrode connecting lines Y-CL.

Accordingly, the plurality of X-touch electrodes X-TE, the plurality of X-touch electrode connecting lines X-CL, the plurality of Y-touch electrodes Y-TE, the plurality of Y-touch electrode lines Y-TEL, and the plurality of Y-touch electrode connecting lines Y-CL may be located on two or more layers, such that the plurality of X-touch electrode lines X-TEL alternate with the plurality of Y-touch electrode lines Y-TEL.

Referring to FIG. 8, each of the plurality of X-touch electrode lines X-TEL is electrically connected to a corresponding X-touch pad X-TP through one or more X-touch routing lines X-TL. That is, the outermost X-touch electrode X-TE among the plurality of X-touch electrodes X-TE included in a single X-touch electrode line X-TEL is electrically connected to a corresponding X-touch pad X-TP via the X-touch routing line X-TL.

Each of the plurality of Y-touch electrode lines Y-TEL is electrically connected to corresponding Y-touch pads Y-TP through one or more Y-touch routing lines Y-TL. That is, the outermost Y-touch electrodes Y-TE among the plurality of Y-touch electrodes Y-TE included in a single Y-touch electrode line Y-TEL is electrically connected to the corresponding Y-touch pads Y-TP through the Y-touch routing lines Y-TL.

In addition, as illustrated in FIG. 8, the plurality of X-touch electrode lines X-TEL and the plurality of Y-touch electrode lines Y-TEL may be disposed on the encapsulation ENCAP. That is, the plurality of X-touch electrodes X-TE, constituting the plurality of X-touch electrode lines X-TEL, and the plurality of X-touch electrode connecting lines X-CL may be disposed on the encapsulation ENCAP. The plurality of Y-touch electrodes Y-TE, constituting the plurality of Y-touch electrode lines Y-TEL, and the plurality of Y-touch electrode connecting lines Y-CL may be disposed on the encapsulation ENCAP.

In addition, as illustrated in FIG. 8, the plurality of X-touch routing lines X-TL electrically connected to the plurality of X-touch electrode lines X-TEL may be disposed on the encapsulation ENCAP and extend to a location in which the encapsulation ENCAP is not provided, thereby being electrically connected to a plurality of X-touch pads X-TP, respectively. The plurality of Y-touch routing lines Y-TL electrically connected to the plurality of Y-touch electrode lines Y-TEL may be disposed on the encapsulation ENCAP and extend to a location in which encapsulation ENCAP is not provided, thereby being electrically connected to a plurality of Y-touch pads Y-TP, respectively. Here, the encapsulation ENCAP may be located in the active area AA and, in some cases, may expand to the nonactive area NA.

In addition, as described above, a dam area DA may be provided at the boundary between the active area AA and the nonactive area NA or in the nonactive area NA at the periphery of the active area AA in order to prevent a layer (e.g. an encapsulation in the OLED display panel) in the active area AA from collapsing.

As illustrated in FIG. 8, for example, a first dam DAM1 and a second dam DAM2 may be disposed in the dam area DA. Here, the second dam DAM2 may be located more outward than the first dam DAM1.

In a manner different from that illustrated in FIG. 8, only the first dam DAM1 may be located in the dam area DA. In some cases, not only the first dam DAM1 and the second dam DAM2 but also one or more additional dam may be disposed in the dam area DA.

Referring to FIG. 8, the encapsulation ENCAP may be located on a side of the first dam DAM1 or be located both on a side of and above the first dam DAM1.

Figure 9:
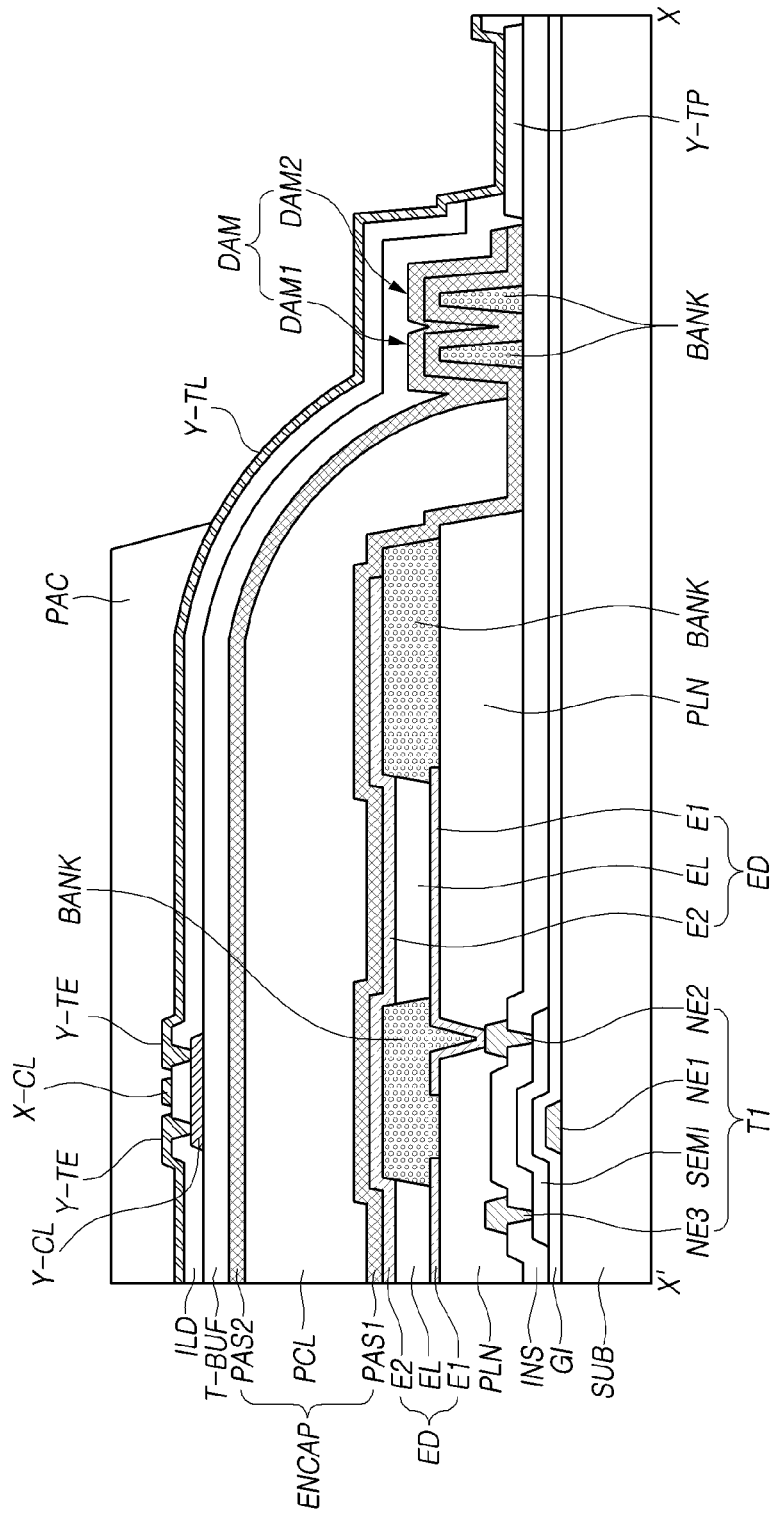
FIG. 9 is a cross-sectional diagram illustrating portions of the display panel taken along line X-X' in FIG. 8 according to embodiments.

FIG. 9 is a cross-sectional diagram illustrating portions of the display panel DISP according to embodiments, taken along line X-X' in FIG. 8. In FIG. 9, the touch electrode TE is illustrated in the shape of a plate. However, this is illustrative only, and the touch electrode TE may be mesh shaped. In a case in which the touch electrode TE is mesh shaped, the open areas OA of the touch electrode TE may be located above the emissive areas of subpixels SP.

The first transistor T1, i.e. the driving transistor in each of the subpixels SP in the active area AA, is disposed on the substrate SUB.

The first transistor T1 includes a first node electrode NE1 corresponding to the gate electrode, a second node electrode NE2 corresponding to a source electrode or a drain electrode, a third node electrode NE3 corresponding to a drain electrode or a source electrode, a semiconductor layer SEMI, and the like.

The first node electrode NE1 and the semiconductor layer SEMI may be located on both sides of a gate insulating film GI to overlap each other. The second node electrode NE2 may be provided on an insulating layer INS to be in contact with one side of the semiconductor layer SEMI, while the third node electrode NE3 may be provided on the insulating layer INS to be in contact with the other side of the semiconductor layer SEMI.

The emitting device ED may include a first electrode E1 corresponding to an anode (or cathode), an emitting layer EL provided on the first electrode E1, a second electrode E2 corresponding to a cathode (or anode) provided on the emitting layer EL, and the like.

The first electrode E1 is electrically connected to the second node electrode NE2 of the first transistor T1, exposed through a pixel contact hole extending through a planarization layer PLN.

The emitting layer EL is provided on the first electrode E1 in the emitting area provided by banks BANK. The emitting layer EL is provided on the first electrode E1 and is comprised of a hole-related layer, an emissive layer, and an electron-related layer stacked in the stated order or inversely. The second electrode E2 is provided on the side of the emitting layer EL opposite to the first electrode E1.

The encapsulation ENCAP reduces penetration of external moisture or oxygen into the emitting device ED that is vulnerable to external moisture, oxygen, or the like.

The encapsulation ENCAP may be a single layer or, as illustrated in FIG. 9, be comprised of a plurality of layers PAS1, PCL, and PAS2.

For example, in a case in which the encapsulation ENCAP is comprised of the plurality of layers PAS1, PCL, and PAS2, the encapsulation ENCAP may include one or more inorganic encapsulation layers PAS1 and PAS2 and one or more organic encapsulation layers PCL. As a specific example, the encapsulation ENCAP may have a structure in which the first inorganic encapsulation layer PAS1, the organic encapsulation layer PCL, and the second inorganic encapsulation layer PAS2 are stacked in order.

Here, the organic encapsulation layer PCL may further include at least one organic encapsulation layer or at least one inorganic encapsulation layer.

The first inorganic encapsulation layer PAS1 is provided on the substrate SUB, on which the second electrode E2 corresponding to the cathode is provided, so as to be closest to the emitting device ED. The first inorganic encapsulation layer PAS1 is made of an inorganic insulating material, such as silicon nitride (SiNx), silicon oxide (SiOx), silicon oxynitride (SiON), or aluminum oxide ($Al_2O_3$), which may be deposited at a low temperature. Since the first inorganic encapsulation layer PAS1 is deposited in a low-temperature atmosphere, the first inorganic encapsulation layer PAS1 may reduce damage to the emitting layer EL containing an organic material that is vulnerable to a high-temperature atmosphere during deposition processing.

The organic encapsulation layer PCL may be provided in an area smaller than the area of the first inorganic encapsulation layer PAS1. In this case, the organic encapsulation layer PCL may be configured to expose both edges of the first inorganic encapsulation layer PAS1. The organic encapsulation layer PCL may serve as a buffer to reduce stress between the layers caused by bending of the touch display device and serve to enhance planarization performance. The organic encapsulation layer PCL may be made of, for example, an organic insulating material, such as an acrylic resin, an epoxy resin, polyimide, polyethylene, silicon oxycarbon (SiOC).

In addition, in a case in which the organic encapsulation layer PCL is fabricated by inkjet printing, one or more dams DAM may be provided in the dam area DA corresponding to the boundary between the nonactive area NA and the active area AA or a portion of the nonactive area NA.

For example, as illustrated in FIG. 9, the dam area DA is located between a pad area in the nonactive area NA and the active area AA. The pad area refers to a portion of the nonactive area NA in which the plurality of X-touch pads X-TP and the plurality of Y-touch pads Y-TP are provided. In the dam area DA, the first dam DAM1 adjacent to the active area AA and the second dam DAM2 adjacent to the pad area may be provided.

The one or more dams DAM disposed in the dam area DA may prevent the organic encapsulation layer PCL in a liquid form from collapsing in the direction of the nonactive area NA and penetrating into the pad area when the organic encapsulation layer PCL in the liquid form is dropped to the active area AA.

This effect may be further increased by the provision of the first dam DAM1 and the second dam DAM2 as illustrated in FIG. 9.

At least one of the first dam DAM1 and the second dam DAM2 may have a single layer or multilayer structure. For example, at least one of the first dam DAM1 and the second dam DAM2 may be simultaneously made of the same material as at least one of the banks BANK and spacers (not shown). In this case, a dam structure may be provided without additional mask processing or an increase in cost.

In addition, as illustrated in FIG. 9, at least one of the first dam DAM1 and the second dam DAM2 may have a structure in which at least one of the first inorganic encapsulation layer PAS1 and the second inorganic encapsulation layer PAS2 is stacked on the banks BANK.

In addition, the organic encapsulation layer PCL containing an organic material may be located on an inner side of the first dam DAM1, as illustrated in FIG. 9.

Alternatively, the organic encapsulation layer PCL containing an organic material may be located above at least a portion of the first dam DAM1 and the second dam DAM2. For example, the organic encapsulation layer PCL may be located above the first dam DAM1.

The second inorganic encapsulation layer PAS2 may be provided on the substrate SUB on which the organic encapsulation layer PCL is provided, so as to cover the top surfaces and side surfaces of the organic encapsulation layer PCL and the first inorganic encapsulation layer PAS1. The second inorganic encapsulation layer PAS2 reduces or prevents external moisture or oxygen from penetrating the first inorganic encapsulation layer PAS1 or the organic encapsulation layer PCL. The second inorganic encapsulation layer PAS2 is made of, for example, an inorganic insulating material, such as SiNx, SiOx, SiON, or $Al_2O_3$.

A touch buffer layer T-BUF may be provided on the encapsulation ENCAP. The touch buffer layer T-BUF may be located between the touch sensor metal, including the X and Y-touch electrodes X-TE and Y-TE and X and Y-touch electrode connecting lines X-CL and Y-CL, and the second electrode E2 of the emitting device ED.

The touch buffer layer T-BUF may be designed to maintain a predetermined minimum distance (e.g. 1 µm) between the touch sensor metal and the second electrode E2 of the emitting device ED. Accordingly, this may reduce or prevent parasitic capacitance generated between the touch sensor metal and the second electrode E2 of the emitting device ED, thereby preventing touch sensitivity from being reduced by the parasitic capacitance.

Without the touch buffer layer T-BUF, the touch sensor metal including the X and Y-touch electrodes X-TE and Y-TE and the X and Y-touch electrode connecting lines X-CL and Y-CL may be disposed on the encapsulation ENCAP.

In addition, the touch buffer layer T-BUF may prevent the emitting layer EL containing the organic material from being penetrated by a chemical agent (e.g. a developing solution or an etching solution) used in fabrication processing of the touch sensor metal disposed on the touch buffer layer T-BUF, external moisture, or the like. Accordingly, the touch buffer layer T-BUF may prevent the emitting layer EL vulnerable to the chemical agent or moisture from being damaged.

The touch buffer layer T-BUF is made of an organic insulating material producible at a low temperature equal to or lower than a predetermined temperature (e.g. 100° C.) and having a low dielectric constant of 1 to 3 in order to reduce damage to the emitting layer EL containing the organic material that is vulnerable to high temperature. For example, the touch buffer layer T-BUF may be made of an epoxy-based material or a siloxane-based material. The touch buffer layer T-BUF made of an inorganic insulating material and having a planarization performance may reduce damage to the encapsulation layers PAS1, PCL, and PAS2 of the encapsulation ENCAP or the touch sensor metal on the touch buffer layer T-BUF from being fractured in response to the bending of the OLED display device.

According to the mutual capacitance-based touch sensor structure, the X-touch electrode lines X-TEL and the Y-touch electrode lines Y-TEL are disposed on the touch buffer layer T-BUF, and the X-touch electrode lines X-TEL and the Y-touch electrode lines Y-TEL may be disposed such that the X-touch electrode lines X-TEL intersect the Y-touch electrode lines Y-TEL.

The Y-touch electrode lines Y-TEL may include the plurality of Y-touch electrodes Y-TE and the plurality of Y-touch electrode connecting lines Y-CL electrically connecting the plurality of Y-touch electrodes Y-TE.

As illustrated in FIG. 9, the plurality of Y-touch electrodes Y-TE and the plurality of Y-touch electrode connecting lines Y-CL may be disposed on different layers, on both sides of a touch insulating film IND.

The plurality of Y-touch electrodes Y-TE may be spaced apart from each other by predetermined distances in the Y-axis direction. Each of the plurality of Y-touch electrodes Y-TE may be electrically connected to the other adjacent Y-touch electrodes Y-TE through the Y-touch electrode connecting lines Y-CL in the Y-axis direction.

The Y-touch electrode connecting lines Y-CL may be provided on the touch buffer layer T-BUF and exposed through touch contact holes extending through the touch insulating film IND to be electrically connected to the two adjacent Y-touch electrodes Y-TE in the Y-axis direction.

The Y-touch electrode connecting lines Y-CL may be disposed to overlap the banks BANK. Accordingly, the aperture ratio may be prevented from being decreased by the Y-touch electrode connecting lines Y-CL.

The X-touch electrode lines X-TEL may include the plurality of X-touch electrodes X-TE and the plurality of X-touch electrode connecting lines X-CL electrically connecting the plurality of X-touch electrodes X-TE.

The plurality of X-touch electrodes X-TE may be disposed on the touch insulating film IND, spaced apart from each other by predetermined distances in the X-axis direction. Each of the plurality of X-touch electrodes X-TE may be electrically connected to the adjacent other X-touch electrodes X-TE through the X-touch electrode connecting lines X-CL in the X-axis direction.

The X-touch electrode connecting lines X-CL may be disposed on the same plane as the X-touch electrodes X-TE to be electrically connected to the two adjacent X-touch electrodes X-TE in the X-axis direction without separate contact holes or be integrated with the two adjacent X-touch electrodes X-TE in the X-axis direction.

The X-touch electrode connecting lines X-CL may be disposed to overlap the banks BANK. Accordingly, the aperture ratio may be prevented from being decreased by the X-touch electrode connecting lines X-CL.

In addition, the Y-touch electrode lines Y-TEL may be electrically connected to the touch driving circuit TDC through the Y-touch routing lines Y-TL and the Y-touch pads Y-TP. In the same manner, the X-touch electrode lines X-TEL may be electrically connected to the touch driving circuit TDC through the X-touch routing lines X-TL and the X-touch pads X-TP.

A pad cover electrode covering the X-touch pads X-TP and the Y-touch pads Y-TP may be further disposed.

The X-touch pads X-TP may be provided separately from the X-touch routing lines X-TL or be provided as extensions of the X-touch routing lines X-TL. The Y-touch pads Y-TP may be provided separately from the Y-touch routing lines Y-TL or be provided as extensions of the Y-touch routing lines Y-TL.

In a case in which the X-touch pads X-TP are extensions of the X-touch routing lines X-TL and the Y-touch pads Y-TP are extensions of the Y-touch routing lines Y-TL, the X-touch pads X-TP, the X-touch routing lines X-TL, the Y-touch pads Y-TP, and the Y-touch routing lines Y-TL may be comprised of the same material, i.e. a first conductive material. The first conductive material may have a single or multilayer structure made of a metal, such as Al, Ti, Cu, or Mo, having high corrosion resistance, high acid resistance, and high conductivity.

For example, each of the X-touch pads X-TP, the X-touch routing lines X-TL, the Y-touch pads Y-TP, and the Y-touch routing lines Y-TL comprised of the first conductive material may have a three-layer structure, such as Ti/Al/Ti or Mo/Al/Mo.

The pad cover electrode capable of covering the X-touch pads X-TP and the Y-touch pads Y-TP may be comprised of the same material as the X and Y-touch electrodes X-TE and Y-TE, i.e. a second conductive material. The second conductive material may be a transparent conductive material, such as indium tin oxide (ITO) or indium zinc oxide (IZO), having high corrosion resistance and acid resistance. The pad cover electrodes may be provided to be exposed from the touch buffer layer T-BUF so as to be bonded to the touch driving circuit TDC or to a circuit film on which the touch driving circuit TDC is mounted.

The touch buffer layer T-BUF may be provided to cover the touch sensor metal so as to reduce corrosion of the touch sensor metal by external moisture. For example, the touch buffer layer T-BUF may be made of an organic insulating material or be provided as a circular polarizer or a film made of an epoxy or acrylic material. The touch buffer layer T-BUF may not be provided on the encapsulation ENCAP. That is, the touch buffer layer T-BUF may not be an essential component.

The Y-touch routing lines Y-TL may be electrically connected to the Y-touch electrodes Y-TE via touch routing line contact holes or be integrated with the Y-touch electrodes Y-TE.

Each of the Y-touch routing lines Y-TL may extend to the nonactive area NA, past the top and side portions of the encapsulation ENCAP and the dams DAM, so as to be electrically connected to the Y-touch pads Y-TP. Accordingly, the Y-touch routing lines Y-TL may be electrically connected to the touch driving circuit TDC through the Y-touch pads Y-TP.

The Y-touch routing lines Y-TL may deliver the touch-sensing signal from the Y-touch electrodes Y-TE to the touch driving circuit TDC or deliver the touch driving signal, received from the touch driving circuit TDC, to the Y-touch electrodes Y-TE.

The X-touch routing lines X-TL may be electrically connected to the X-touch electrodes X-TE via the touch routing line contact holes or be integrated with the X-touch electrodes X-TE.

The X-touch routing lines X-TL may extend to the nonactive area NA, past the top and side portions of the encapsulation ENCAP and the dams DAM, so as to be electrically connected to the X-touch pads Y-TP. Accordingly, the X-touch routing lines X-TL may be electrically connected to the touch driving circuit TDC through the X-touch pads X-TP.

The X-touch routing lines X-TL may deliver the touch driving signal, received from the touch driving circuit TDC, to the X-touch electrodes X-TE or deliver touch-sensing signal from the X-touch electrodes X-TE to the touch driving circuit TDC.

The arrangement of the X-touch routing lines X-TL and the Y-touch routing lines Y-TL may be modified variously depending on the design specification of the panel.

A touch protective film PAC may be disposed on the X-touch electrodes X-TE, and the Y-touch electrodes Y-TE. The touch protective film PAC may extend to an area in front of or behind the dams DAM so as to be disposed on the X-touch routing lines X-TL and the Y-touch routing lines Y-TL.

The cross-sectional diagram of FIG. 9 is conceptual illustration of the structure. The positions, thicknesses, or widths of the patterns (e.g. various layers or electrodes) may vary depending on the direction or position of view, the structures for connecting the patterns may be modified, additional layers other than the plurality of illustrated layers may be further provided, and some of the plurality of illustrated layers may be omitted or integrated. For example, the width of the banks BANK may be narrower than that illustrated in the drawings, and the height of the dams DAM may be lower or higher than that illustrated in the drawings. In addition, the cross-sectional diagram of FIG. 9 illustrates a structure in which the touch electrode TE, the touch routing lines TL, and the like are disposed on the entirety of the subpixels SP in order to illustrate a structure connected to the touch pads TP along inclines of the touch routing lines TL and the encapsulation ENCAP. However, in a case in which the touch electrode TE, or the like is mesh-shaped as described above, the open areas OA of the touch electrode TE may be located above the emitting areas of the subpixels SP. In addition, a color filter CF (see FIGS. 10 and 11) may be further disposed on the encapsulation ENCAP. The color filter CF may be located on the touch electrode TE, or between the encapsulation ENCAP and the touch electrode TE.

Figure 10:
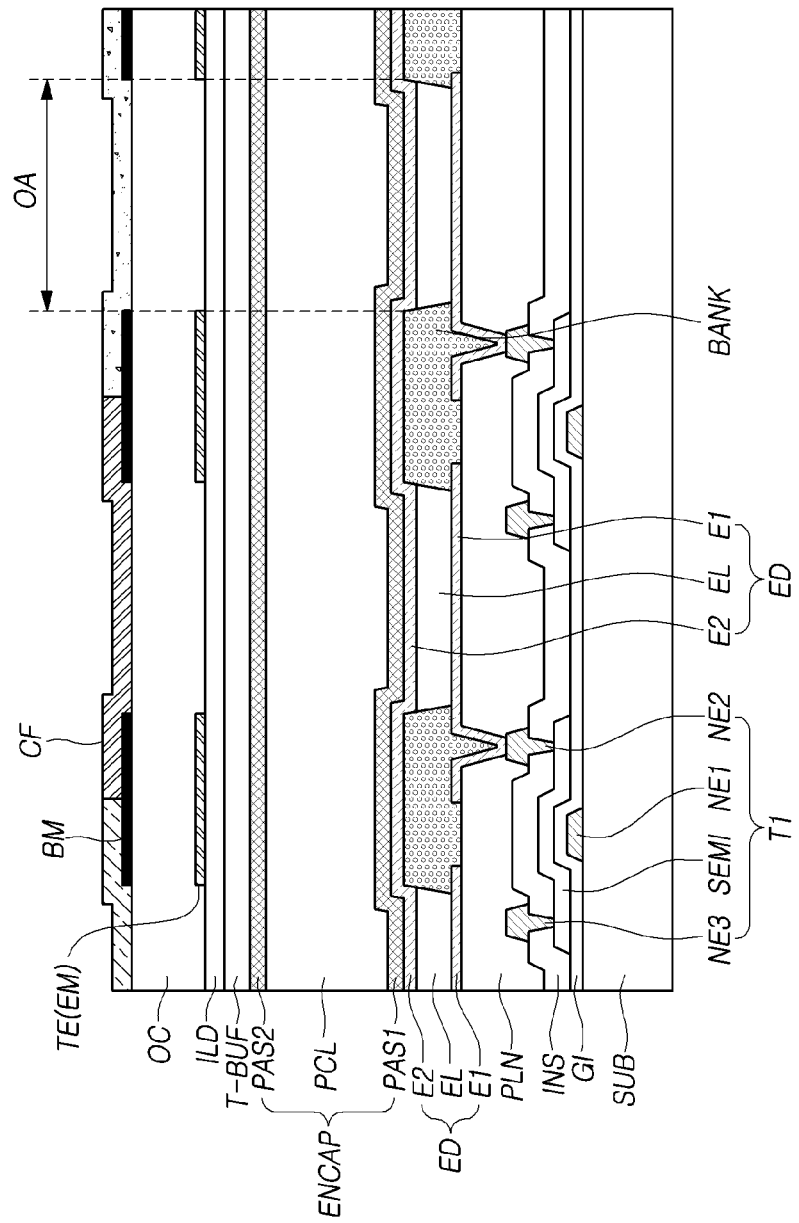
FIGS. 10 and 11 are diagrams illustrating a cross-sectional structure of the display panel including a color filter according to embodiments.
Figure 11:
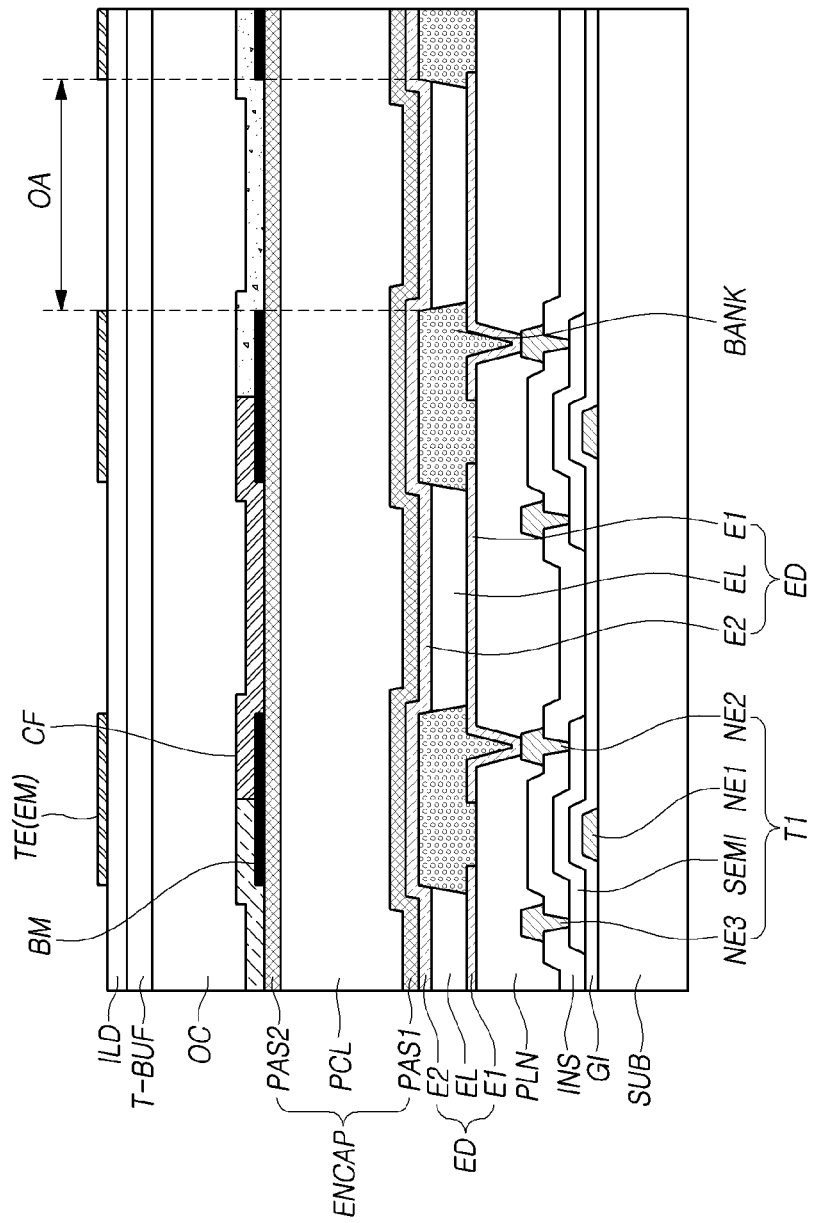

FIGS. 10 and 11 are diagrams illustrating a cross-sectional structure of the display panel DISP according to embodiments, including the color filter CF.

Referring to FIGS. 10 and 11, in a case in which the touch panel TSP is disposed within the display panel DISP and the display panel DISP is provided as an OLED display panel, the touch panel TSP may be located on the encapsulation ENCAP in the display panel DISP. That is, the touch sensor metals, such as the plurality of touch electrodes TE and the plurality of touch routing lines TL, may be located on the encapsulation ENCAP in the display panel DISP.

The touch electrode TE being provided on the encapsulation ENCAP as described above may form the touch electrode TE without significantly influencing the display performance or the formation of a display-related layer.

Referring to FIGS. 10 and 11, the second electrode E2 that may be the cathode of the OLED may be located below the encapsulation ENCAP.

The thickness T of the encapsulation ENCAP may be, for example, 1 μm or more.

Since the thickness of the encapsulation ENCAP is designed to be 1 μm or more as described above, parasitic capacitance generated between the second electrode E2 and the touch electrodes TE of the OLED may be reduced, thereby preventing touch sensitivity from being reduced by the parasitic capacitance.

As described above, each of the plurality of touch electrodes TE is patterned in the shape of a mesh, in which the electrode metal EM has two or more open areas OA. Each of the two or more open areas OA may correspond to one or more subpixels or the emitting areas thereof when viewed in a vertical direction.

As described above, the electrode metal EM of the touch electrode TE may be patterned such that the emitting area of one or more subpixels is provided in a position corresponding to each of the two or more open areas OA present in the area of the touch electrode TE when viewed in a plan view. Accordingly, the luminous efficiency of the display panel DISP may be improved.

As illustrated in FIGS. 10 and 11, a black matrix BM may be provided in the display panel DISP. The color filter CF may be further provided in the display panel DISP.

The position of the black matrix BM may correspond to the position of the electrode metal EM of the touch electrode 1B.

The positions of the plurality of color filters CF correspond to the positions of the plurality of touch electrodes TE or the position of the electrode metal EM constituting the plurality of touch electrodes TE.

Since the plurality of color filters CF are located in positions corresponding to the plurality of open areas OA as described above, the luminous performance of the display panel DISP may be improved.

The vertical positional relationship between the plurality of color filters CF and the plurality of touch electrodes TE will be described as follows.

As illustrated in FIG. 10, the plurality of color filters CF and the black matrix BM may be located on the plurality of touch electrodes TE.

In this case, the plurality of color filters CF and the black matrix BM may be located on the overcoat layer OC disposed on the plurality of touch electrodes TE. Here, the overcoat layer OC may be the same layer as or a different layer from the touch protective film PAC illustrated in FIG. 9.

Alternatively, as illustrated in FIG. 11, the plurality of color filters CF and the black matrix BM may be located below the plurality of touch electrodes TE.

In this case, the plurality of touch electrodes TE may be located on the overcoat layer OC on the plurality of color filters CF and the black matrix BM. The overcoat layer OC may be the same layer as or a different layer from the touch buffer layer T-BUF or the touch insulating film IND illustrated in FIG. 9. Alternatively, the touch buffer layer T-BUF or the touch insulating film IND may be disposed in a manner separate from the overcoat layer OC.

Due to the vertical positional relationship between the touch electrode TE and a display driving configuration being adjusted as described above, a touch sensing configuration may be disposed without degrading the display performance.

In addition, the display panel DISP according to embodiments may include a sensor, such as a camera sensor or a proximity sensor. In addition, although such a sensor may be disposed in the nonactive area NA of the display panel DISP, the sensor may be disposed in a portion of the active area AA to reduce the nonactive area NA.

That is, depending on the type of the display panel DISP, the active area AA may include an area in which no images are displayed and a sensor, such as a camera sensor, is disposed.

Figure 12:
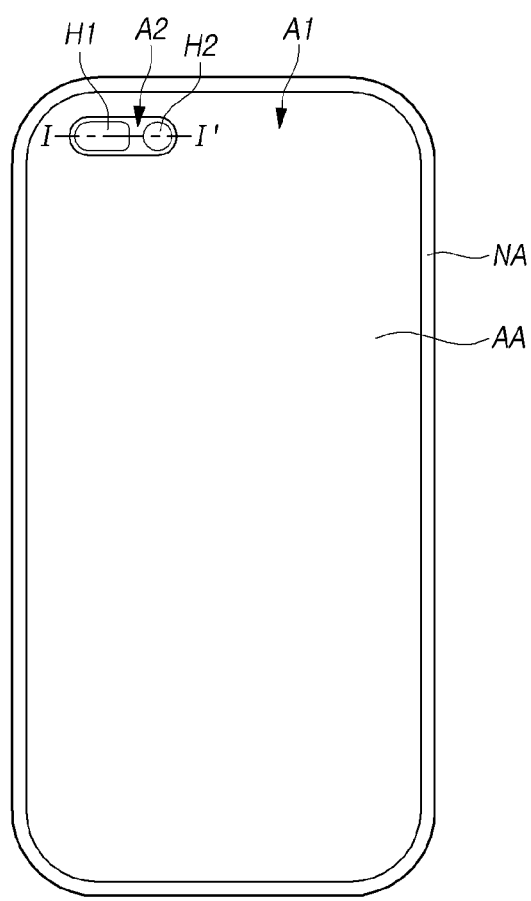
FIG. 12 is a diagram illustrating the display panel in which a hole is provided in the active area according to embodiments.

FIG. 12 is a diagram illustrating the display panel DISP according to embodiments, in which a hole is provided in the active area AA.

Referring to FIG. 12, the display panel DISP may include the active area AA in which the subpixels SP, the touch electrodes TE, and the like are disposed and the nonactive area NA located at the periphery of the active area AA.

The active area AA may include a first area A1 in which the subpixels SP are disposed and images are displayed and a second area A2 in which sensors, such as a camera sensor, are disposed and no images are displayed.

A portion of the periphery of the second area A2 may be in contact with the periphery of the first area A1. At least a portion of the periphery of the second area A2 may be disposed more inward than the periphery of the first area A1. Alternatively, as illustrated in FIG. 12, the entire periphery of the second area A2 may be disposed more inward than the periphery of the first area A1.

That is, at least a portion of the second area A2 accommodating the sensor or the like may be disposed in the active area AA so as to be surrounded by the first area A1.

The plurality of subpixels SP may be disposed in the first area A1 of the active area AA. The gate lines, the data lines, and the like for driving the subpixels SP may also be disposed in the first area A1. Portions of the gate lines, the data lines, and the like connected to the subpixels SP adjacent to the second area A2 may be disposed to surround the periphery of the second area A2.

Since the sensors are disposed and no images are displayed in the second area A2 of the active area AA, none of the subpixels SP or the gate lines, the data lines, and the like for driving the subpixels SP may be disposed in the second area A2.

Alternatively, in some cases, specific electrodes or signal lines disposed in the subpixels SP may be disposed in the second area A2, but the signal lines or the like disposed in the second area A2 may be disconnected from signal lines disposed in the first area A1 so as not to be driven.

At least hole accommodating a sensor may be disposed in the second area A2 of the active area AA.

For example, as illustrated in FIG. 12, a first hole H1 and a second hole H2 spaced apart from the first hole H1 may be disposed in the second area A2. The first hole H1 and the second hole H2 may have the same shape and size or, as illustrated in FIG. 12, have different shapes and sizes.

Sensors may be disposed in the first and second holes H1 and H2 of the second area A2. Gate lines, data lines, and the like connected to the subpixels SP located outside of the second area A2 may be disposed in overlapping areas in which the periphery of the second area A2 overlaps the peripheries of the first and second holes H1 and H2.

In a case in which the first and second holes H1 and H2 are disposed in the second area A2, an area in which no images are displayed may be present between the first and second holes H1 and H2. Here, specific touch electrodes TE may be disposed between the first and second holes H1 and H2 to overlap the area in which no images are displayed.

Figure 13:
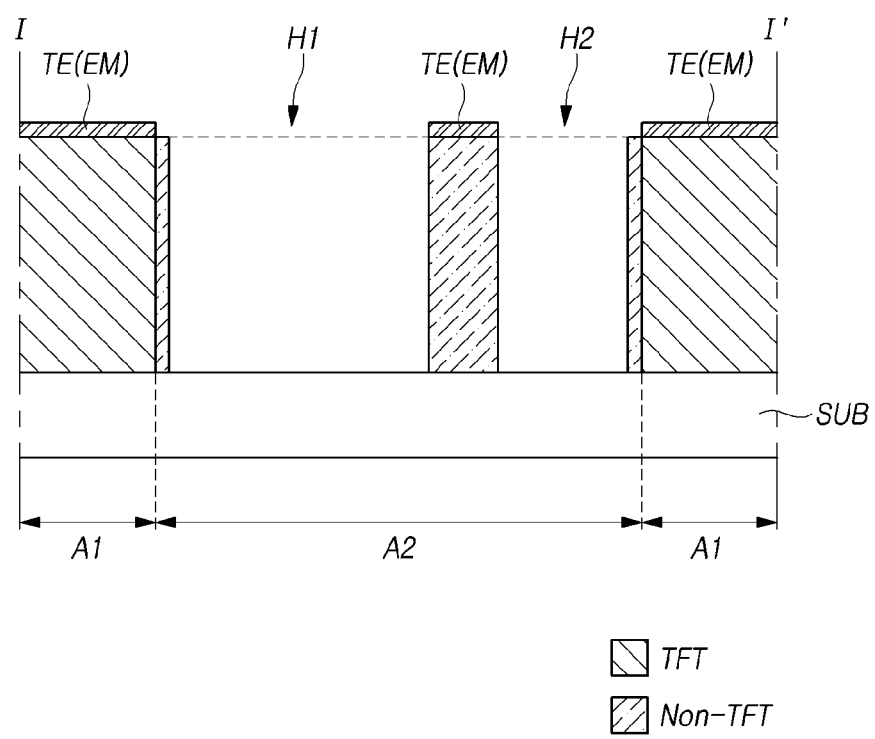
FIG. 13 is a diagram illustrating a cross-sectional structure of portion I-I' illustrating in FIG. 12 according to embodiments.

FIG. 13 is a diagram illustrating a cross-sectional structure of portion I-I' illustrating in FIG. 12.

Referring to FIG. 13, an area corresponding to the first area A1 of the active area AA on the substrate SUB of the display panel DISP may be a thin-film transistor (TFT) area in which emitting devices ED, circuit elements, and the like for displaying images are disposed.

An area on the substrate SUB corresponding to the second area A2 of the active area AA may be a non-TFT area in which the image display configuration is not disposed. Since the second area A2 must have a hole in which sensors or the like are to be provided, no elements may be disposed in the second area A2 in a process of disposing the circuit elements and the emitting devices ED on the substrate SUB.

In a case in which a plurality of holes are present in the second area A2, an area may be present between the adjacent holes. As illustrated in FIG. 13, an area may be present between the first hole H1 and the second hole H2. In the area between the first hole H1 and the second hole H2, an electrode metal EM, such as a touch electrode TE or a touch electrode connecting line, for the touch sensing may be disposed.

As described above, the touch electrode TE or the like for the touch sensing may be disposed on the encapsulation ENCAP. Thus, even in a case in which no display driving elements are disposed in the second area A2, the touch electrode TE may be disposed in the second area A2 after the provision of the encapsulation ENCAP, since the second area A2 is the area in which the holes are provided. In addition, the touch electrode TE may be disposed in at least a portion of the second area A2, except for the areas in which the holes are provided.

For example, as illustrated in FIG. 13, the electrode metal EM, such as the touch electrode TE or the touch electrode connecting line, may be disposed in the portion of the second area A2 overlapping the area between the first hole H1 and the second hole H2. In addition, the touch electrode TE may be further disposed in portions between the peripheries of the first and second holes H1 and H2 and the periphery of the second area A2.

In this manner, in the second area A2 having holes in which a camera sensor or the like is to be disposed, the touch electrode TE may be disposed in at least a portion of the second area A2, except for the portions overlapping the holes. In addition, since the touch electrode TE is disposed in a portion of the second area A2, the touch electrode TE disposed in the first area A1 adjacent to the second area A2 may be connected to a conductive line using the touch electrode TE disposed in the second area A2.

That is, since the touch electrode TE is provided in a portion of the active area AA in which no images are displayed due to the provision of the holes, the connection of the touch electrode TE or the touch electrode connecting line disposed around the holes may be facilitated.

Figure 14:
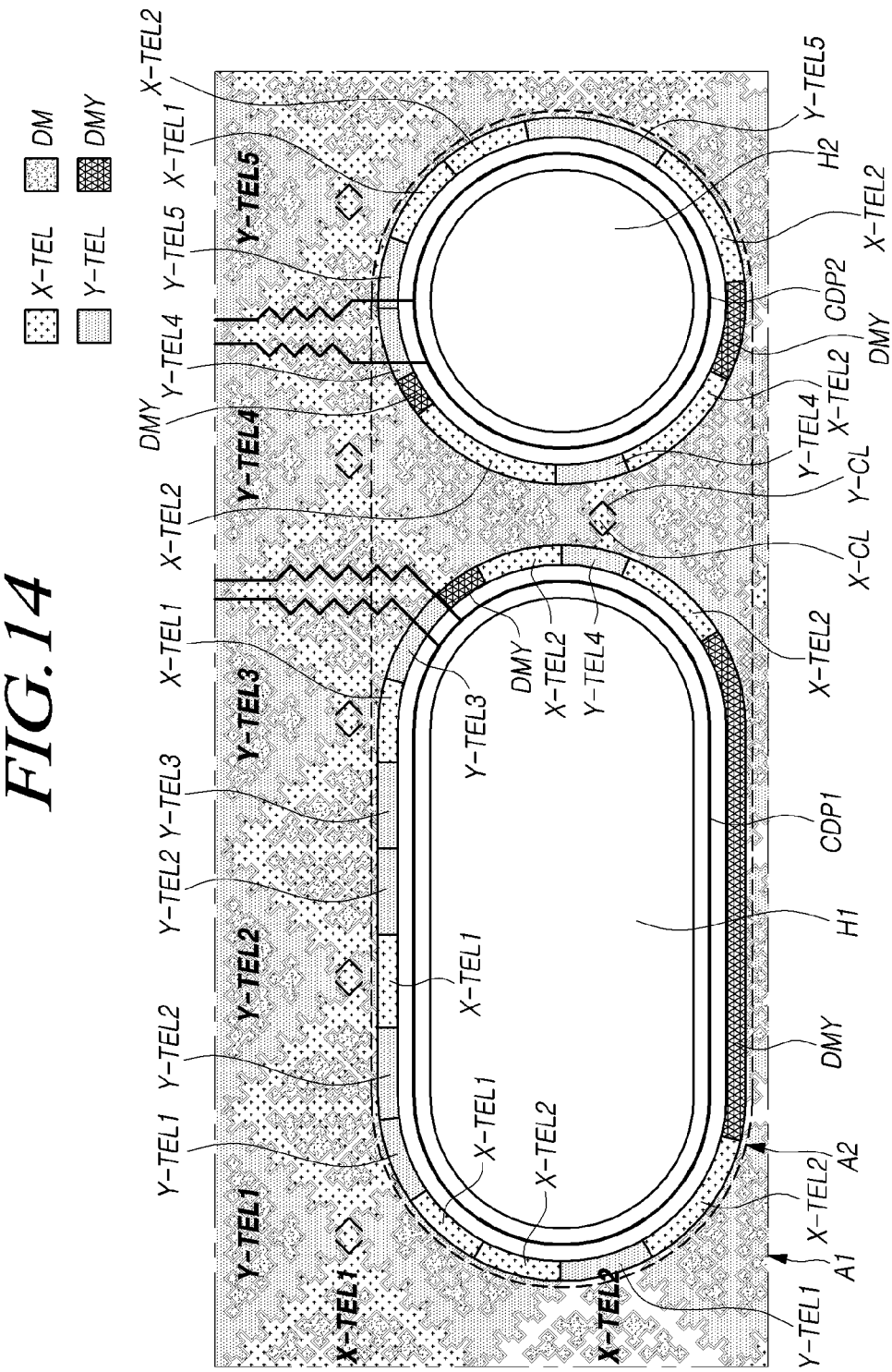
FIG. 14 is a diagram illustrating a structure in which the touch electrodes and the touch electrode connecting lines are disposed in the areas around the holes illustrated in FIG. 12 according to embodiments.

FIG. 14 is a diagram illustrating a structure in which the touch electrodes TE and the touch electrode connecting lines are disposed in the areas around the holes illustrated in FIG. 12.

Referring to FIG. 14, the active area AA may include the first area A1 in which the subpixels SP or the like are disposed and images are displayed and the second area A2 in which no subpixels are disposed and no images are displayed. The second area A2 may have at least one hole in which a camera sensor or the like is disposed. For example, as illustrated in FIG. 14, the second area A2 may include the first hole H1 and the second hole H2. The first hole H1 and the second hole H2 may be spaced apart from each other in the second area A2.

In the first area A1 located at the periphery of the second area A2, the subpixels SP for displaying images are disposed. The touch electrodes TE, the touch electrode connecting lines, and the like may be disposed on the encapsulation ENCAP.

Among the plurality of touch electrodes TE, the touch electrodes TE adjacent in the first direction may be connected to each other to provide the X-touch electrode lines X-TEL. In addition, the touch electrodes TE adjacent in the second direction may be connected to each other to provide the Y-touch electrode lines Y-TEL.

The touch electrodes TE included in each of the X-touch electrode lines X-TEL may be connected to each other by the X-touch electrode connecting lines X-CL disposed on the same layer as the touch electrodes TE. In addition, the touch electrodes TE included in each of the Y-touch electrode lines Y-TEL may be connected to each other by the Y-touch electrode connecting lines Y-CL disposed on the same layer as the touch electrodes TE.

In addition, at least one floating dummy metal DM disconnected from the touch electrode TE may be disposed within the touch electrode TE.

At least portions of the X-touch electrode lines X-TEL and the Y-touch electrode lines Y-TEL may be configured to pass through the second area A2 in which the holes are provided. That is, since the second area A2 including the holes is located within the active area AA, a portion of the touch electrode line TEL disposed in the active area AA may not pass through the second area A2.

For example, as illustrated in FIG. 14, two (2) X-touch electrode lines X-TEL1 and X-TEL2 may be disposed to pass through the second area A2 from the left to the right. In addition, five (5) Y-touch electrode lines Y-TEL1, Y-TEL2, Y-TEL3, Y-TEL4, and Y-TEL5 may be disposed to pass through the second area A2 from the top to the bottom.

The touch electrode lines TEL passing through the second area A2 may be connected to portions of the touch electrodes TE disposed in portions of the second area A2, except for the areas in which the holes are disposed.

The touch electrode lines TEL disposed in the first area A1 may be connected to the touch electrodes TE disposed between the peripheries of the holes in the second area A2 and the periphery of the second area A2. Here, the touch electrodes TE disposed between the peripheries of the holes in the second area A2 and the periphery of the second area A2 may be regarded as auxiliary touch electrodes.

As illustrated in FIG. 14, the auxiliary touch electrodes are disposed in areas in contact with the periphery of the first hole H1 or the periphery of the second hole H2. The auxiliary touch electrodes may be connected to the touch electrodes TE disposed in the first area A1, outside of the second area A2, thereby providing the touch electrode lines TEL. In addition, the auxiliary touch electrodes connected to different touch electrode lines TEL may be disconnected from each other.

The auxiliary touch electrodes located around the holes may be disposed to have a structure capable of increasing the area in which capacitance may be generated.

For example, the auxiliary touch electrodes, located atop the left portion of the periphery of the first hole H1 and comprised of the first X-touch electrode line X-TEL1 and the second X-touch electrode line X-TEL2, may be disposed adjacent to the first Y-touch electrode line Y-TEL1.

In addition, the auxiliary touch electrodes, located to the left of the top portion of the periphery of the first hole H1 and comprised of the first Y-touch electrode line Y-TEL1 and the second Y-touch electrode line Y-TEL2, may be disposed adjacent to the first X-touch electrode line X-TEL1.

As described above, the auxiliary touch electrodes disposed around the hole may be disposed to have a structure connecting the touch electrodes TE disposed in the first area A1 and increasing capacitance generated between the auxiliary touch electrodes and the touch electrodes TE disposed in the first area A1. Accordingly, the structure for connecting the touch electrodes TE disposed around the second area A2 may be provided, and the capacitance between the touch electrode lines TEL may be increased, thereby improving touch sensitivity.

An area including no auxiliary touch electrodes may be present around the hole. In this case, the dummy electrodes DMY may be disposed in this area while being disconnected from the auxiliary touch electrodes disposed around the hole. Such dummy electrodes DMY may be floating electrodes and be disposed in the area in which none of the touch electrodes TE and the auxiliary touch electrodes are disposed, thereby preventing the visibility issue.

In addition, a crack detecting pattern CDP may be disposed between the periphery of the hole and the auxiliary touch electrodes.

For example, a first crack detecting pattern CDP1 may be disposed between the periphery of the first hole H1 and the auxiliary touch electrodes. In addition, a second crack detecting pattern CDP2 may be disposed between the periphery of the second hole H2 and the auxiliary touch electrodes.

A portion of the crack detecting pattern CDP may be disposed on the same layer as the touch electrodes TE and be made of the same metal as the electrode metals EM of the touch electrodes TE. In addition, a portion of the crack detecting pattern CDP may be disposed on a layer different from that of the touch electrode connecting lines connecting the touch electrodes TE, and be made of the same metal as the touch electrode connecting lines.

The crack detecting pattern CDP may be disposed between the periphery of the hole and the area in which the touch electrodes TE and the like are disposed, so as to detect cracks that may be produced during the process of forming the holes.

Portions of the touch electrodes TE, the touch electrode connecting lines, and the like may be disposed in the area between the first hole H1 and the second hole H2 in the second area A2.

For example, as illustrated in FIG. 14, a portion of the first X-touch electrode line X-TEL1 and a portion of the second X-touch electrode line X-TEL2 may be disposed in the area between the first hole H1 and the second hole H2. In addition, a portion of the fourth Y-touch electrode line Y-TEL4 may be disposed in the area between the first hole H1 and the second hole H2.

Due to the touch electrodes TE and the like being disposed in the area between the first hole H1 and the second hole H2 in the second area A2 as described above, the touch electrodes TE and the like located in the first area A1, outside of the second area A2, may be easily connected.

In addition, embodiments provide a solution able to improve touch sensitivity in the area between the first hole H1 and the second hole H2 by setting the array structure of the touch electrodes TE disposed in the area between the first hole H1 and the second hole H2 to be different from the array structure of the touch electrodes TE disposed outside of the second area A2.

FIG. 15 is a diagram illustrating another structure in which the touch electrodes TE and the touch electrode connecting lines are disposed in the areas around the holes illustrated in FIG. 12.

Referring to FIG. 15, the active area AA, the second area A2 in which the hole or the like for accommodating a sensor is located within the first area A1 in which images are displayed.

Since the second area A2 is located within the active area AA, the touch electrodes TE disposed in the first area A1 located around the second area A2 may have different shapes. In addition, sensing nodes defined by the intersection of the X-touch electrode lines X-TEL and the Y-touch electrode lines Y-TEL may have different areas.

As illustrated in FIG. 15, the area of a sensing node N located below the second area A2 may be greater than the area of a sensing node M located above the second area A2. In addition, since a portion of the second area A2 is present between the first hole H1 and the second hole H2, a sensing node L may be provided between the first hole H1 and the second hole H2. The area of the sensing node L may be smaller than the area of either the sensing node N or the sensing node M.

To improve sensing performance in the sensing node L having a relatively smaller area, the number of the touch electrode connecting lines connecting the touch electrodes TE in each of the touch electrode lines TEL, by which the sensing node L is defined, may be increased.

For example, as illustrated in FIG. 15, the number of the X-touch electrode connecting lines X-CL connecting the touch electrodes TE of the X-touch electrode line X-TEL in the area between the first hole H1 and the second hole H2 may be 3. That is, in the area outside of the second area A2, the touch electrodes TE of a single X-touch electrode line X-TEL are connected by a single X-touch electrode connecting line X-CL. In contrast, in the area between the first hole H1 and the second hole H2, the touch electrodes TE may be connected by a larger number of X-touch electrode connecting lines X-CL.

The touch electrode line TEL, in which the number of touch electrode connecting lines connecting the touch electrodes TE is increased, may be the touch electrode line TEL disposed in a direction in which the holes are lined up. That is, the number of the X-touch electrode connecting lines X-CL included in the X-touch electrode line X-TEL disposed in a first direction in which a virtual line connecting the center of the first hole H1 and the center of the second hole H2 extends, i.e. the X-axis direction, may be increased.

With increases in the number of the X-touch electrode connecting lines X-CL connecting the touch electrodes TE of the X-touch electrode line X-TEL between the first hole H1 and the second hole H2, the size of the touch electrodes TE of the Y-touch electrode line Y-TEL disposed between the first hole H1 and the second hole H2 is reduced while the number of the touch electrodes TE is increased. In addition, the distances between the Y-touch electrode connecting lines X-CL of the Y-touch electrode line Y-TEL may be reduced.

That is, due to the increased number of X-touch electrode connecting lines X-CL, the touch electrodes TE of the Y-touch electrode line Y-TEL are separated.

Accordingly, in the area between the first hole H1 and the second hole H2, portions in which capacitance is generated between the X-touch electrode lines X-TEL and the Y-touch electrode lines Y-TEL are increased.

Since the capacitance generated between the X-touch electrode lines X-TEL and the Y-touch electrode lines Y-TEL is increased in the area between the first hole H1 and the second hole H2, the sensitivity of touch sensing may be increased even in a case in which the area of the sensing node defined between the first hole H1 and the second hole H2 is reduced.

Accordingly, in the portion of the second area A2 between the first hole H1 and the second hole H2, the touch sensing function may be provided.

Although FIG. 15 illustrates a case in which, in the area between the first hole H1 and the second hole H2, the X-touch electrode connecting lines X-CL are disposed on the same layer as the touch electrodes TE and the Y-touch electrode connecting lines Y-CL are disposed on a layer different from the touch electrodes TE, the same may be applied to a case in which the Y-touch electrode connecting lines Y-CL are disposed on the same layer as the touch electrodes TE and the X-touch electrode connecting lines X-CL are disposed on a layer different from the touch electrodes TE.

In addition, the sensitivity of touch sensing in the area between the first hole H1 and the second hole H2 may be improved by adjusting the ratio of the dummy metals DM in the touch electrodes TE disposed between the first hole H1 and the second hole H2.

Since the second area A2 is the area in which no images are displayed, the visibility issue due to the provision of the electrode metal EM may not occur. Accordingly, each of the touch electrodes TE disposed in the second area A2 may not include the dummy metal DM or a relatively small number of dummy metals DM.

Since the number of the dummy metals DM disposed in the area between the first hole and the second hole H2 is reduced, the area of the touch electrodes TE generating capacitance may be increased. In addition, the relatively small ratio of the dummy metals DM may facilitate the designing of the array structure of the touch electrodes TE for increasing capacitance generated by the X-touch electrode lines X-TEL and the Y-touch electrode lines Y-TEL.

In addition, although embodiments have been described with respect to the structures in which a plurality of holes are provided in the second area A2, the same may be applied to a structure in which a single hole is provided in the active area AA.

That is, the number of touch electrode connecting lines connected to touch electrodes TE adjacent to the hole may be greater than the number of touch electrode connecting lines connected to touch electrodes TE, except for the touch electrodes TE adjacent to the hole or touch electrodes TE directly connected to the touch electrodes TE adjacent to the hole.

The structure for increasing the number of the touch electrode connecting lines disposed in the area in which the area of a sensing node is reduced by the shape change of the touch electrodes TE due to the provision of the hole may improve the sensitivity of touch sensing in the surrounding areas of the hole.

According to the embodiments as set forth above, since the touch electrodes TE are disposed in at least a portion of an area, in which the holes are provided and no images are displayed, of the active area AA, the structure for connecting the touch electrodes TE disposed in the surrounding areas of the holes may be easily provided.

In addition, in the structure in which a plurality of holes are located in the active area, the sensitivity of touch sensing in the area between the holes may be improved by the structure disposed in the area between the holes to increase the number of the touch electrode connecting lines.

Accordingly, in the touch display device, the performance of touch sensing may be improved. In addition, the touch electrodes TE disposed in the surrounding areas of the holes in the structure in which the holes are provided in the active area AA may be easily connected.

The above description has been presented to enable any person skilled in the art to make and use the technical idea of the present invention, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present invention. The above description and the accompanying drawings provide an example of the technical idea of the present invention for illustrative purposes only. That is, the disclosed embodiments are intended to illustrate the scope of the technical idea of the present invention. Thus, the scope of the present invention is not limited to the embodiments shown, but is to be accorded the widest scope consistent with the claims. The scope of protection of the present invention should be construed based on the following claims, and all technical ideas within the scope of equivalents thereof should be construed as being included within the scope of the present invention.

What is claimed is:

1. A touch display device comprising:
    an active area including a first area in which a plurality of subpixels are disposed and a second area located more inward than at least a portion of a periphery of the first area, the second area overlapping a portion of the active area, except for a portion of the active area in which the plurality of subpixels are disposed;
    a first hole located in the second area;
    a second hole located in the second area and spaced apart from the first hole;
    a plurality of touch electrodes disposed in the first area and disposed in at least a portion of the second area, except for a portion in which the first hole and the second hole are disposed; and
    a plurality of touch electrode connecting lines electrically connecting two adjacent touch electrodes among the plurality of touch electrodes,
    wherein a number of touch electrode connecting lines, among the plurality of touch electrode connecting lines, connecting two adjacent touch electrodes, among the plurality of touch electrodes, in a first direction between the first hole and the second hole is greater than a number of touch electrode connecting lines, among the plurality of touch electrode connecting lines, connecting two adjacent touch electrodes, among the plurality of touch electrodes, outside of the second area.

2. The touch display device according to claim 1, wherein the first direction is a direction in which a virtual line connecting a center of the first hole and a center of the second hole extends.

3. The touch display device according to claim 1, wherein a distance between touch electrode connecting lines connecting two adjacent touch electrodes in a second direction intersecting the first direction, between the first hole and the second hole, is smaller than a distance between touch electrode connecting lines connecting two adjacent touch electrodes in the second direction outside of the second area.

4. The touch display device according to claim 1, further comprising a plurality of auxiliary touch electrodes located between peripheries of the first hole and the second hole and a periphery of the second area and electrically connected to touch electrodes located outside of the second area among the plurality of touch electrodes.

5. The touch display device according to claim 4, wherein adjacent auxiliary touch electrodes among the plurality of auxiliary touch electrodes are separated from each other.

6. The touch display device according to claim 4, further comprising a crack detecting pattern located between peripheries of the first hole and the second hole and the auxiliary touch electrodes and insulated from the auxiliary touch electrodes and the plurality of touch electrodes, at least a portion of the crack detecting pattern being disposed on a same layer as the plurality of touch electrodes.

7. The touch display device according to claim 1, further comprising at least one dummy electrode disposed between peripheries of the first hole and the second hole and a periphery of the second area to be separated from the plurality of touch electrodes.

8. The touch display device according to claim 1, further comprising at least one dummy metal located within a touch electrode among the plurality of touch electrodes and separated from the touch electrode,
    wherein a ratio of the dummy metal included in the touch electrode disposed between the first hole and the second hole is smaller than a ratio of the dummy metal included in the touch electrode disposed outside of the second area.

9. The touch display device according to claim 1, wherein a number of touch electrodes disposed in a unit area between the first hole and the second hole, among the plurality of touch electrodes, is greater than a number of touch electrodes disposed in the unit area in the first area, among the plurality of touch electrodes.

10. The touch display device according to claim 1, wherein a size of a touch electrode disposed between the first hole and the second hole, among the plurality of touch electrodes, is greater than a size of a touch electrode disposed in the first area, among the plurality of touch electrodes.

11. The touch display device according to claim 1, wherein each of the plurality of touch electrodes is a mesh-shaped touch electrode including at least one open area, the open area of the touch electrode overlapping an emitting area of a corresponding subpixel among the plurality of subpixels.

\* \* \* \* \*